(12) United States Patent
Yasumura

(10) Patent No.: US 7,095,629 B2
(45) Date of Patent: Aug. 22, 2006

(54) SWITCHING POWER SUPPLY CIRCUIT

(75) Inventor: Masayuki Yasumura, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/528,543

(22) PCT Filed: Aug. 5, 2004

(86) PCT No.: PCT/JP2004/011561

§ 371 (c)(1),
(2), (4) Date: Mar. 21, 2005

(87) PCT Pub. No.: WO2005/015724

PCT Pub. Date: Feb. 17, 2005

(65) Prior Publication Data

US 2006/0114697 A1    Jun. 1, 2006

(30) Foreign Application Priority Data

Aug. 6, 2003   (JP)   ............................. 2003-287887
Sep. 11, 2003  (JP)   ............................. 2003-319754
Jun. 9, 2004   (JP)   ............................. 2004-171499

(51) Int. Cl.
    *H02M 3/335*    (2006.01)
(52) U.S. Cl. ......................................... 363/16; 363/25
(58) Field of Classification Search ................ 363/16, 363/127, 15, 25, 24
    See application file for complete search history.

(56) References Cited

U.S. PATENT DOCUMENTS 5,274,543 A * 12/1993 Loftus, Jr. .................. 363/127
5,999,417 A * 12/1999 Schlecht .................... 363/16

FOREIGN PATENT DOCUMENTS

| JP | 11-332233 A   | 11/1999 |
| JP | 2002-095248 A | 3/2002  |
| JP | 2002-218748 A | 8/2002  |
| JP | 2002-262568 A | 9/2002  |

* cited by examiner

*Primary Examiner*—Shawn Riley
(74) *Attorney, Agent, or Firm*—Lerner, David, Littenberg, Krumholz & Mentlik, LLP

(57) ABSTRACT

A switching power supply circuit in which, in order to both provide high power conversion efficiency of a complex resonant converter having a synchronous rectifier circuit and reduce a circuit scale and cost by simplifying the circuit, a synchronous rectifier circuit of a winding voltage detection system is provided on a secondary side of the complex resonant converter, a coupling coefficient is decreased to about 0.8 by setting a gap length in an isolated converter transformer to about 1.5 mm, and numbers of turns of a primary winding and secondary windings are set such that a level of a voltage induced per turn (T) of the secondary windings is 2 V/T. Thus, since magnetic flux density at a core of the isolated converter transformer is decreased to a certain value or lower, a secondary side rectified current can be in a continuous mode even under a condition of heavy load.

8 Claims, 22 Drawing Sheets

SWITCHING POWER SUPPLY CIRCUIT

TECHNICAL FIELD

The present invention relates to a switching power supply circuit provided as a power supply in various electronic apparatus.

BACKGROUND ART

Switching power supply circuits employing switching converters such for example as flyback converters and forward converters are widely known. These switching converters form a rectangular waveform in switching operation, and therefore there is a limit to suppression of switching noise. It is also known that because of their operating characteristics, there is a limit to improvement of power conversion efficiency.

Accordingly, various switching power supply circuits using a resonant converter have been proposed (see for example Japanese Patent Laid-Open No. Hei 11-332233), and put to practical use. A resonant converter can readily provide high power conversion efficiency, and achieve low noise because the resonant converter forms a sinusoidal waveform in switching operation. The resonant converter has another advantage of being able to be formed by a relatively small number of parts.

FIG. 24 is a circuit diagram showing an example of a conventional switching power supply circuit having a resonant converter. In the power supply circuit shown in the figure, a partial voltage resonant circuit is combined with a current resonant converter of an externally excited type.

In the power supply circuit shown in this figure, a full-wave rectifying and smoothing circuit comprising a bridge rectifier circuit Di and one smoothing capacitor Ci is provided to a commercial alternating-current power supply AC. As a result of a full-wave rectifying operation by the bridge rectifier circuit Di and the smoothing capacitor Ci, a rectified and smoothed voltage Ei (direct-current input voltage) is obtained across the smoothing capacitor Ci. This rectified and smoothed voltage Ei has a level equal to that of an alternating input voltage VAC.

The current resonant converter supplied with the direct-current input voltage and switching the direct-current input voltage has two MOS-FET switching devices Q1 and Q2 connected to each other by half-bridge coupling as shown in the figure. Damper diodes DD1 and DD2 formed by body diodes are connected in a direction shown in the figure in parallel with the switching devices Q1 and Q2 between a drain and a source of the switching devices Q1 and Q2, respectively.

A partial resonant capacitor Cp is connected in parallel with the switching device Q2 between the drain and the source of the switching device Q2. A capacitance of the partial resonant capacitor Cp and a leakage inductance L1 of a primary winding N1 form a parallel resonant circuit (a partial voltage resonant circuit). Then, a partial voltage resonant operation, in which voltage resonance occurs only when the switching devices Q1 and Q2 are turned off, is obtained.

The power supply circuit is provided with an oscillation and drive circuit 2 formed by a general-purpose IC, for example, for switching-driving the switching devices Q1 and Q2. The oscillation and drive circuit 2 has an oscillating circuit and a driving circuit. The oscillating circuit and the driving circuit apply a drive signal (a gate voltage) of a required frequency to gates of the switching devices Q1 and Q2. Thereby the switching devices Q1 and Q2 perform switching operation so as to be turned on/off alternately at the required switching frequency.

An isolated converter transformer PIT is provided to transmit a switching output of the switching devices Q1 and Q2 to a secondary side. One end of the primary winding N1 of the isolated converter transformer PIT is connected via a series connection of a primary side parallel resonant capacitor C1 to a junction (a switching output point) between the source of the switching device Q1 and the drain of the switching device Q2, whereby the switching output is transmitted.

Another end of the primary winding N1 is connected to a primary side ground.

A capacitance of the series resonant capacitor C1 and the leakage inductance L1 of the isolated converter transformer PIT including the primary winding N1 form a primary side series resonant circuit for converting an operation of a primary side switching converter into a current resonance type operation.

According to the above description, the primary side switching converter shown in this figure obtains the current resonance type operation by the primary side series resonant circuit (L1-C1) and the partial voltage resonant operation by the partial voltage resonant circuit (Cp//L1) described above.

That is, the power supply circuit shown in this figure employs a form in which a resonant circuit for making the primary side switching converter a resonant converter is combined with another resonant circuit. In the present specification, such a switching converter will be referred to as a complex resonant converter.

Though not described with reference to a figure, the isolated converter transformer PIT has an E-E-shaped core formed by combining E-shaped cores made of a ferrite material with each other. The isolated converter transformer PIT has a primary side winding part and a secondary side winding part divided from each other. The primary winding N1 and a secondary winding (N2A and N2B) to be described next are wound around the central magnetic leg of the E-E-shaped core.

Two secondary windings N2A and N2B divided by being provided with a center tap are wound as the secondary winding of the isolated converter transformer PIT. An alternating voltage corresponding to the switching output transmitted to the primary winding N1 is induced in the secondary windings N2A and N2B.

In this case, the center tap of the secondary windings N2A and N2B is connected to a secondary side ground. A full-wave rectifier circuit comprising rectifier diodes D01 and D02 and a smoothing capacitor C0 is connected to the secondary windings N2A and N2B as shown in the figure. Thereby a secondary side direct-current output voltage EO is obtained as a voltage across the smoothing capacitor C0. The secondary side direct-current output voltage EO is supplied to a load side not shown in the figure, and also inputted from a branch point as a detection voltage for a control circuit 1 to be described next.

The control circuit 1 supplies a detection output corresponding to change in level of the secondary side direct-current output voltage EO to the oscillation and drive circuit 2. The oscillation and drive circuit 2 drives the switching devices Q1 and Q2 so as to vary switching frequency according to the supplied detection output of the control circuit 1. Thus varying the switching frequency of the switching devices Q1 and Q2 stabilizes the level of the secondary side direct-current output voltage.

Operating waveforms when the power supply circuit having the circuit configuration shown in this figure meets a load condition of low voltage and high current are shown in FIG. 25. The operating waveforms shown in FIG. 25 were obtained when a measurement was performed under a condition of the alternating input voltage VAC=100 V and load power Po=125 W. The condition of the low voltage and the high current in this case is a condition of the secondary side direct-current output voltage Eo=5 V and a primary side series resonance current Io as a switching current of the primary side switching converter=25 A.

In obtaining the experimental result of the operating waveforms shown in FIG. 25, conditions and parts and elements and the like of the power supply circuit are selected as follows.

First, numbers of turns of the secondary windings N2A and N2B and the primary winding N1 are set such that a voltage level induced per T (turn) of the secondary side winding is 5 V/T. Specifically, the secondary winding N2A=N2B=1 T and the primary winding N1=30 T.

Then, a gap about 1.0 mm is formed in the central magnetic leg of the E-E-shaped core of the isolated converter transformer PIT. Thereby a coupling coefficient of about 0.85 is obtained between the primary winding N1 and the secondary windings N2A and N2B.

The primary side series resonant capacitor C1=0.068 g F and the partial voltage resonant capacitor Cp=330 pF are selected. As the rectifier diodes Do1 and Do2, 50A/40V Schottky diodes are selected.

A voltage V1 across the switching device Q2 in the waveform chart of FIG. 25 corresponds to an on/off state of the switching device Q2. Specifically, the voltage V1 is a rectangular wave, having a zero level during a period T2 when the switching device Q2 is turned on and being clamped at a predetermined level during a period T1 when the switching device Q2 is turned off. A switching current IDS2 flowing through the switching device Q2//the damper diode DD2 has a waveform such that during the period T2, the switching current IDS2 flows through the damper diode DD2 and is thus of a negative polarity at a time of turn-on, and is then inverted to flow through the drain and the source of the switching device Q2 with a positive polarity, and such that the switching current IDS2 is at a zero level during the off period T1.

The switching device Q1 performs switching so as to be turned on/off alternately with the switching device Q2. Therefore a switching current IDS1 flowing through the switching device Q1//the damper diode DD1 has a waveform shifted 180° in phase with respect to the switching current IDS2.

A primary side series resonance current Io flowing through the primary side series resonant circuit (C1-L1) connected between the switching output point of the switching devices Q1 and Q2 and the primary side ground is a waveform resulting from a synthesis of a sinusoidal wave component as the resonance current of the primary side series resonant circuit (C1-L1) and a sawtooth wave component produced by an exciting inductance of the primary winding N1, the waveform corresponding to a synthetic waveform of the switching current IDS1 and the switching current IDS2.

A measurement condition of the load power Po=125 W in this case is a condition of a heavy load close to a maximum as a load condition met by the power supply circuit shown in FIG. 24. In the condition of the heavy load in a range of load power handled by the power supply circuit, a rectified current on the secondary side is in a discontinuous mode.

Specifically, as shown in FIG. 25, a secondary winding voltage V2 occurring at the secondary winding N2A has a waveform clamped at a predetermined absolute value level only during a period when the primary side series resonance current Io flows in the form of a sinusoidal wave, and has a zero level during an interval when the sawtooth wave component produced by the exciting inductance flows as the primary side series resonance current Io between the periods when the primary side series resonance current Io flows in the form of a sinusoidal wave. A waveform obtained by inverting the secondary winding voltage V2 occurs at the secondary winding N2B.

Thus, a rectified current I1 flowing through the rectifier diode Do1 and a rectified current I2 flowing through the rectifier diode Do2 flow only in periods DON1 and DON2, respectively, during which the primary side series resonance current Io flows in the form of a sinusoidal wave. Neither of the rectified currents I1 and I2 flows in other periods. That is, the secondary side rectified current flows into the smoothing capacitor discontinuously.

A forward-direction voltage drop of the rectifier diodes Do1 and Do2 formed by Schottky diodes is 0.6 V. In the above-described operation on the secondary side, since the rectified currents I1 and I2 have a fairly high level of 35 Ap as shown in the figure, a conduction loss by these rectifier diode devices is noticeable, and thus a power loss is increased. As a result of an actual measurement, DC-to-DC power conversion efficiency when the direct-current input voltage (rectified and smoothed voltage Ei)=130 V is only about 86%.

As techniques for reducing the conduction loss of the rectified current on the secondary side, a synchronous rectifier circuit is known which performs rectification by MOS-FETs having a low on resistance. FIG. 26 shows an example of configuration of such a synchronous rectifier circuit using a winding voltage detection system.

Incidentally, FIG. 26 shows only a configuration on a secondary side of an isolated converter transformer PIT. A configuration on a primary side is the same as in FIG. 24. As a constant-voltage control system, a switching frequency control system is employed which variably controls switching frequency of a primary side switching converter according to level of a secondary side direct-current output voltage Eo.

A power supply circuit employing the secondary side configuration shown in FIG. 26 also meets the same condition of low voltage and high current (VAC=100 V, load power Po=125 W, Eo=5 V, and Io=25 A) as in the case of FIG. 24.

Also in this case, one end of each of secondary windings N2A and N2B having the same number of turns as a secondary winding is connected to a center tap. However, an output of the center tap is connected to a positive electrode terminal of a smoothing capacitor C0. Another end of the secondary winding N2A is connected to a secondary side ground (a negative electrode terminal side of the smoothing capacitor C0) via a drain and a source of an N-channel MOS-FET Q3. Similarly, another end of the secondary winding N2B is connected to the secondary side ground (the negative electrode terminal side of the smoothing capacitor C0) via a drain and a source of an N-channel MOS-FET Q4. That is, in this case, the MOS-FETs Q3 and Q4 are inserted in series in respective rectified current paths of the secondary windings N2A and N2B on the negative electrode side. Body diodes DD3 and DD4 are connected to the drain and the source of the MOS-FETs Q3 and Q4, respectively.

A driving circuit for driving the MOS-FET Q3 is formed by connecting a gate resistance Rg1 between a junction between the secondary winding N2B and the drain of the MOS-FET Q4 and a gate of the MOS-FET Q3, and connecting a resistance R11 between the gate of the MOS-FET Q3 and the secondary side ground.

Similarly, a driving circuit for driving the MOS-FET Q4 is formed by connecting a gate resistance Rg2 between a junction between the secondary winding N2A and the drain of the MOS-FET Q3 and a gate of the MOS-FET Q4, and connecting a resistance R12 between the gate of the MOS-FET Q4 and the secondary side ground.

When an on voltage is applied to a gate of a MOS-FET, a region between a drain and a source of the MOS-FET becomes equivalent to a mere resistor, so that a current flows bidirectionally. When the MOS-FET is to be made to function as a secondary side rectifying device, the current needs to flow in only a direction to charge the positive electrode terminal of the smoothing capacitor C0. If a current flows in an opposite direction, a discharge current flows from the smoothing capacitor C0 to the isolated converter transformer PIT side, so that power cannot be efficiently transmitted to a load side. Also, the opposite current causes heat generation of the MOS-FET, noise and the like, and invites a switching loss on the primary side.

The driving circuits described above are circuits for switching-driving the MOS-FETs Q3 and Q4 so that current flows in only the direction to charge the positive electrode terminal of the smoothing capacitor C0 (that is, from the drain to the source) on the basis of detection of a voltage of the secondary winding.

A waveform chart of FIG. 27 shows operation of the power supply circuit employing the secondary side configuration shown in FIG. 26 (the primary side configuration is the same as in FIG. 24) when the load power Po=125 W. As described above, the load power Po=125 W in this case is a condition of substantially a maximum load.

In this figure, a voltage V1 across a switching device Q2 and a corresponding secondary winding voltage V2 obtained across the secondary windings N2A and N2B are in timing similar to that in FIG. 24. Incidentally, the secondary winding voltage V2 shown in FIG. 27 has a polarity as viewed from a junction between the secondary winding N2A and the gate resistance Rg2. The secondary winding voltage V2 is of an opposite polarity as viewed from a junction between the secondary winding N2B and the gate resistance Rg1.

At the time of arrival of a period during which the secondary winding voltage V2 of the polarity shown in this figure is clamped at a predetermined level of negative polarity, the driving circuit for driving the MOS-FET Q4 operates to apply an on voltage at a level set by the gate resistance Rg2 and the resistance R12 to the gate of the MOS-FET Q4.

Similarly, at the time of arrival of a period during which the secondary winding voltage (V2) of the polarity opposite to that shown in this figure is clamped at a predetermined level of negative polarity, the driving circuit (the gate resistance Rg1 and the resistance R11) for driving the MOS-FET Q3 operates to apply an on voltage to the gate of the MOS-FET Q3.

Thus, rectified currents I1 and I2 of positive polarity flow through the MOS-FETs Q3 and Q4 in periods DON1 and DON2, respectively, as shown in the figure. The rectified currents I1 and I2 are 35 Ap as in the case of the circuit of FIG. 24 (the rectified currents I1 and I2 in the waveform chart of FIG. 25). However, the MOS-FETs Q3 and Q4 have a low on resistance, and thus a conduction loss of the rectified currents can be greatly reduced as compared with the rectifier diodes Do1 and Do2 formed by Schottky diodes. In addition, as is understood from the fact that the driving circuits are formed by only resistive elements, the winding voltage detection system has an advantage in that the driving circuit system is of a simple configuration.

However, in the condition of a heavy load corresponding to FIG. 27 (the load power Po=125 W), the secondary side rectified current in this power supply circuit is also in a discontinuous mode. This is indicated by discontinuity between the periods DON1 and DON2 in FIG. 27.

In the discontinuous mode, even when a current for charging the smoothing capacitor Co as the rectified currents I1 and I2 becomes a zero level, a current flows through the primary winding N1 of the isolated converter transformer PIT in the same direction. This indicates that in the foregoing waveform chart of FIG. 25, the sawtooth wave current component produced by the exciting inductance of the primary winding N1 flows as the primary side series resonance current Io in periods other than the periods DON1 and DON2 with the same polarity as in immediately preceding timing. Therefore, in actuality, the polarity of a voltage induced in the secondary windings N2A and N2B is not inverted, and in the meanwhile the MOS-FETs Q3 and Q4 maintain an on state without being completely turned off. Thus, a current in an opposite direction flows as the rectified currents I1 and I2 in the periods other than the periods DON1 and DON2 as shown in the figure. The rectified currents I1 and I2 in the opposite direction in the periods other than the periods DON1 and DON2 cause ineffective power. Since the rectified currents I1 and I2 in these periods have a relatively high level of 8 Ap, an amount of ineffective power is correspondingly large.

Thus, when the synchronous rectifier circuit employs the winding voltage detection system, while the conduction loss of the rectified currents is reduced, it is difficult to effectively improve total power conversion efficiency because of occurrence of ineffective power as described above.

A waveform chart of FIG. 28 shows operation of the power supply circuit employing the secondary side configuration shown in FIG. 26 under a condition of a light load.

As with the configuration of the power supply circuit shown in FIG. 24 as described above, the power supply circuit shown in FIG. 26 in practice performs constant-voltage control by controlling switching frequency. When the secondary side direct-current output voltage is increased under a condition of a light load, the power supply circuit operates to increase the switching frequency to decrease the secondary side direct-current output voltage, whereby the secondary side direct-current output voltage is stabilized.

In such a light-load condition, the secondary side winding voltage V2 is inverted in substantially the same timing as the voltage V1 across the switching device Q2 as shown in FIG. 28. Accordingly, the secondary side rectified currents I1 and I2 flow so as to continuously charge the smoothing capacitor Co without a period of discontinuity between periods DON1 and DON2. That is, a continuous mode is obtained. In this case, there are no periods when the rectified currents I1 and I2 in the opposite direction flow as in the operation at the heavy load as shown in FIG. 27, and thus correspondingly no ineffective power is produced.

Thus, the power supply circuit having the configuration obtained by replacing the secondary side rectifier circuit system with the synchronous rectifier circuit using the winding voltage detection system still has the problem of decrease in power conversion efficiency at the time of heavy load.

As techniques for solving the problem of occurrence of ineffective power caused by the rectified currents in the opposite direction as shown in FIG. 27, a synchronous rectifier circuit using a rectified current detection system is known. The rectified current detection system is a technique that turns off a MOS-FET before a rectified current for charging a smoothing capacitor Co becomes a zero level.

FIG. 29 shows an example of configuration of a synchronous rectifier circuit using this rectified current detection system. Incidentally, for simplicity of description, this figure shows a configuration for half-wave rectification.

In the rectified current detection system, a current transformer TR is provided to detect a current flowing through a secondary winding N2. A primary winding Na of the current transformer is connected to an end part of the secondary winding N2 and a drain of a MOS-FET Q4. A source of the MOS-FET Q4 is connected to a negative electrode terminal of a smoothing capacitor Co.

A secondary winding Nb of the current transformer is connected in parallel with a resistance Ra, and also connected in parallel with diodes Da and Db such that directions of forward voltages of the diodes Da and Db are opposite to each other, whereby a parallel connection circuit is formed. Further, the parallel connection circuit is connected with a comparator 20. A reference voltage Vref is inputted to an inverting input of the comparator 20. A junction between the reference voltage Vref and the inverting input of the comparator 20 is connected to an end part of a side where an anode of the diode Da and a cathode of the diode Db are connected in the parallel connection circuit. A non-inverting input of the comparator 20 is connected with an end part of a side where a cathode of the diode Da and an anode of the diode Db are connected in the parallel connection circuit.

In this case, an output of the comparator 20 is amplified by a buffer 21 and then applied to a gate of the MOS-FET Q4.

FIG. 30 shows operation of the circuit having the configuration shown in FIG. 29.

When a voltage induced in the secondary winding N2 becomes higher than a voltage (Eo) across the smoothing capacitor Co, a rectified current Id first starts to flow in a direction from an anode to a cathode of a body diode of the MOS-FET Q4 so as to charge the smoothing capacitor Co. Since the rectified current Id flows through the primary winding Na of the current transformer, a voltage Vnb corresponding to the rectified current Id flowing through the primary winding Na is induced in the secondary winding Nb of the current transformer. The comparator 20 compares the voltage Vnb with the reference voltage Vref. When the voltage Vnb exceeds the reference voltage Vref, the comparator 20 outputs an H level. This H level output is applied as an on voltage from the buffer 21 to the gate of the MOS-FET Q4 to turn on the MOS-FET Q4. Thus the rectified current Id flows from the drain to the source of the MOS-FET Q4. FIG. 30 shows the rectified current Id flowing with positive polarity.

Then, as the level of the rectified current Id is lowered with passage of time and correspondingly the voltage Vnb becomes lower than the reference voltage Vref, the comparator 20 inverts the output. The inverted output is output via the buffer 21 to discharge a gate capacitance of the MOS-FET Q4 and thereby turn off the MOS-FET Q4. Incidentally, the remaining rectified current Id at this point in time flows via a body diode DD4 within a short time.

With such an operation, the MOS-FET Q4 is turned off before the rectified current Id becomes a zero level. Thus, the flowing of the currents in the opposite direction through the MOS-FETs during the periods of discontinuity of the rectified currents as shown in FIG. 27 does not occur, so that ineffective power is not produced and power conversion efficiency is correspondingly increased.

For example, a measurement result obtained shows that DC-to-DC power conversion efficiency when the configuration on the secondary side of the power supply circuit shown in FIG. 24 is a synchronous rectifier circuit using the rectified current detection system for full-wave rectification which circuit is based on the configuration shown in FIG. 29 is improved to about 90% under the same condition as that of FIG. 25, FIG. 27 and the like.

As is understood from FIG. 29, however, the synchronous rectifier circuit of the above-described rectified current detection system requires, for one MOS-FET, at least one current transformer set and a relatively complex driving circuit system for driving the MOS-FET by an output of the current transformer. This complicates the circuit configuration, leading to disadvantages of decrease in manufacturing efficiency, increase in cost, increase in size of a circuit board, and the like.

In particular, when the synchronous rectifier circuit of the rectified current detection system is provided on the secondary side with the configuration of the primary side switching converter shown in FIG. 24 as a basis, a double-wave rectifier circuit needs to be formed on the secondary side. Therefore two current transformers and two driving circuit systems as described above are required for the MOS-FETs Q3 and Q4, thus aggravating the above problem.

Thus, the winding voltage detection system and the rectified current detection system are in a tradeoff relation in that the winding voltage detection system is disadvantageous in terms of power conversion efficiency because of ineffective power but enables a simple circuit configuration, whereas the rectified current detection system is advantageous in terms of power conversion efficiency because ineffective power is not produced but makes circuit configuration complex.

DISCLOSURE OF INVENTION

Hence a configuration that is as simple as possible and solves the problem of increase in loss due to ineffective power is required of a power supply circuit having a synchronous rectifier circuit.

In view of the above problems, a switching power supply circuit according to the present invention is comprised as follows.

The switching power supply circuit includes: a switching unit formed with switching devices, for performing switching so as to interrupt a direct-current input voltage input to the switching unit; and a driving unit for switching-driving the switching devices.

The switching power supply circuit also includes an isolated converter transformer for transmitting a switching output of the switching unit from a primary side to a secondary side, the isolated converter transformer including at least a primary winding and a secondary winding wound in the isolated converter transformer.

The switching power supply circuit further includes: a primary side resonant capacitor connected to a predetermined part on the primary side so as to form a primary side resonant circuit for converting operation of the switching unit into a resonance type operation with at least an leakage inductance component of the primary winding of the isolated converter transformer and a capacitance of the primary side resonant capacitor; a primary side partial voltage resonant circuit for performing a partial voltage resonant operation during a period that the switching devices forming the switching unit are turned off, the primary side partial voltage resonant circuit being formed by a capacitance of a partial resonant capacitor connected in parallel with at least one of the switching devices forming the switching unit and the leakage inductance component of the primary winding of the isolated converter transformer; and a synchronous rectifier circuit for providing a secondary side direct-current output voltage as a voltage across a secondary side smoothing capacitor by performing rectifying operation on an alternating voltage induced in the secondary winding of the isolated converter transformer and charging the secondary side smoothing capacitor with a rectified current.

The synchronous rectifier circuit includes: a first field-effect transistor inserted between one end part of the secondary winding and a negative electrode terminal of the secondary side smoothing capacitor; and a second field-effect transistor inserted between another end part of the secondary winding and the negative electrode terminal of the secondary side smoothing capacitor.

The synchronous rectifier circuit further includes: a first driving circuit for detecting, by a resistive element, a secondary winding voltage corresponding to a half-wave period that the first field-effect transistor is to make a rectified current flow, and outputting a gate voltage for turning on the first field-effect transistor; and a second driving circuit for detecting, by a resistive element, a secondary winding voltage corresponding to a half-wave period that the second field-effect transistor is to make a rectified current flow, and outputting a gate voltage for turning on the second field-effect transistor.

Further, magnetic flux density of the isolated converter transformer is set to a predetermined value or lower so that the secondary side rectified current flowing through the synchronous rectifier circuit as a result of the rectifying operation is in a continuous mode irrespective of variation in a condition of a load connected to the secondary side direct-current voltage. The switching power supply circuit having the above-described configuration employs, as a primary side switching converter, the configuration of a complex resonant converter in which a partial voltage resonant circuit is combined with a resonant converter, and has a synchronous rectifier circuit of a winding voltage detection system on the secondary side.

Further, since the magnetic flux density of the isolated converter transformer is set to a predetermined value or lower so that the secondary side rectified current is always in a continuous mode irrespective of load variation. The secondary side rectified current in the continuous mode prevents ineffective power caused by a current in an opposite direction flowing through the field-effect transistors during periods of discontinuity of the secondary side rectified current, which is a problem in the synchronous rectifier circuit of the winding voltage detection system.

BEST MODE FOR CARRYING OUT THE INVENTION

Figure 1:
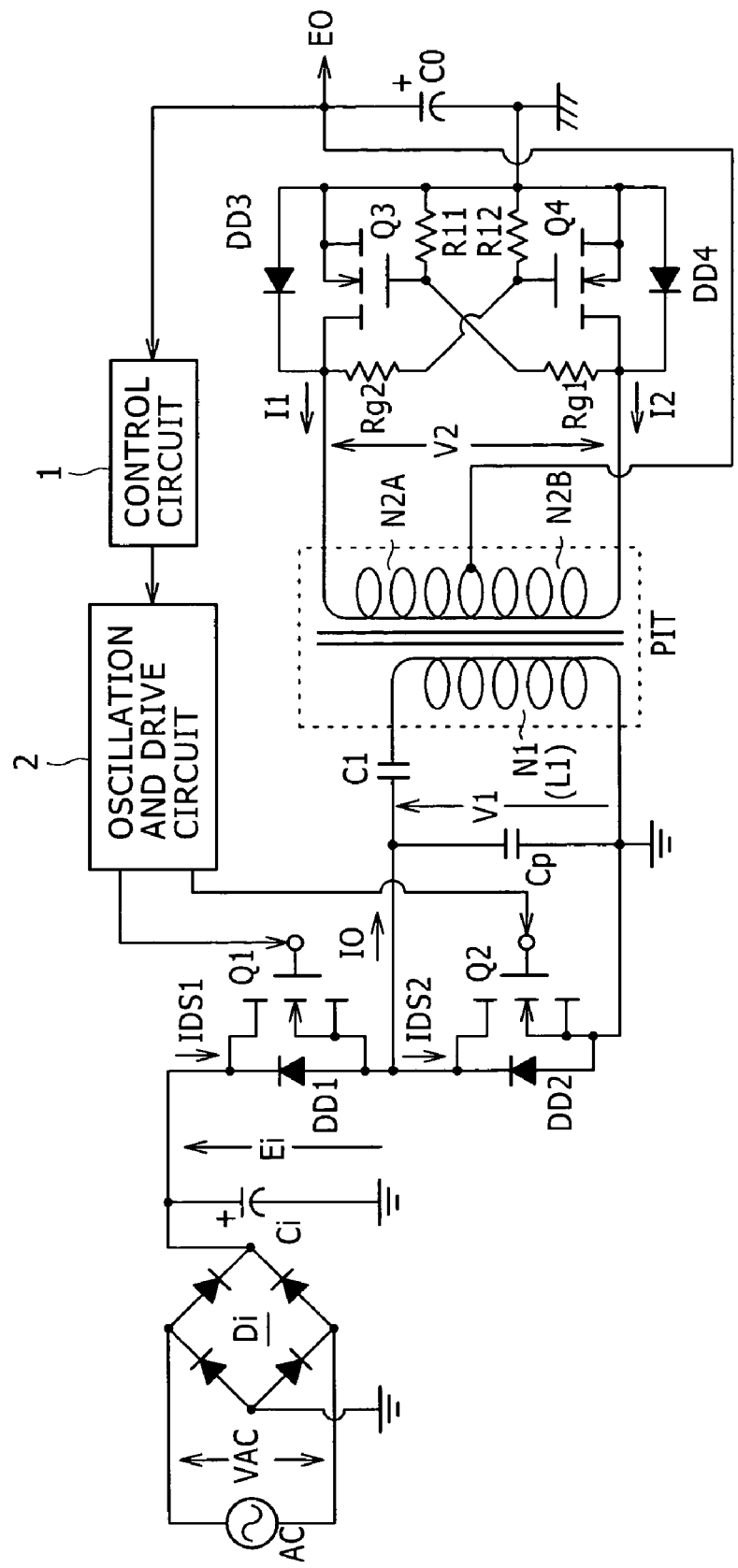
FIG. 1 is a circuit diagram showing an example of configuration of a switching power supply circuit according to a first embodiment of the present invention.

FIG. 1 shows an example of configuration of a switching power supply circuit as a first embodiment of the best mode for carrying out the invention (hereinafter referred to as an embodiment).

The power supply circuit shown in this figure has a basic configuration formed by combining a current resonant converter of an externally excited type and a half-bridge coupling type with a partial voltage resonant circuit.

In the power supply circuit shown in this figure, a full-wave rectifying and smoothing circuit formed by a bridge rectifier circuit as a rectifier circuit part Di and one smoothing capacitor Ci is connected to a commercial alternating-current power supply AC. The full-wave rectifying and smoothing circuit is supplied with the commercial alternating-current power supply AC, and performs a full-wave rectifying operation on the commercial alternating-current power supply AC, whereby a rectified and smoothed voltage Ei (direct-current input voltage) is obtained across the smoothing capacitor Ci. The rectified and smoothed voltage Ei in this case has a level equal to that of an alternating input voltage VAC.

The current resonant converter supplied with the direct-current input voltage and switching (interrupting) the direct-current input voltage has a switching circuit formed by connecting two MOS-FET switching devices Q1 and Q2 to each other by half-bridge coupling as shown in the figure. Damper diodes DD1 and DD2 are connected in parallel with the switching devices Q1 and Q2 between a drain and a source of the switching devices Q1 and Q2, respectively. An anode and a cathode of the damper diode DD1 are connected to the source and the drain, respectively, of the switching device Q1. Similarly, an anode and a cathode of the damper diode DD2 are connected to the source and the drain, respectively, of the switching device Q2. The damper diodes DD1 and DD2 are body diodes possessed by the switching devices Q1 and Q2, respectively.

A partial resonant capacitor Cp is connected in parallel with the switching device Q2 between the drain and the source of the switching device Q2. A capacitance of the partial resonant capacitor Cp and a leakage inductance L1 of a primary winding N1 form a parallel resonant circuit (a partial voltage resonant circuit). Then, a partial voltage resonant operation, in which voltage resonance occurs only when the switching devices Q1 and Q2 are turned off, is obtained.

The power supply circuit is provided with an oscillation and drive circuit 2 for switching-driving the switching devices Q1 and Q2. The oscillation and drive circuit 2 has an oscillating circuit and a driving circuit. A general-purpose IC, for example, can be used as the oscillation and drive circuit 2. The oscillating circuit and the driving circuit within the oscillation and drive circuit 2 apply a drive signal (a gate voltage) of a required frequency to gates of the switching devices Q1 and Q2. Thereby the switching devices Q1 and Q2 perform switching operation so as to be turned on/off alternately at the required switching frequency.

An isolated converter transformer PIT is provided to transmit a switching output of the switching devices Q1  and Q2 to a secondary side.

One end part of the primary winding N1 of the isolated converter transformer PIT is connected via a series connection of a primary side parallel resonant capacitor C1 to a junction (a switching output point) between the source of the switching device Q1 and the drain of the switching device Q2, whereby the switching output is transmitted.

Another end part of the primary winding N1 is connected to a primary side ground.

The isolated converter transformer PIT produces the required leakage inductance L1 at the primary winding N1 of the isolated converter transformer PIT by a structure to be described later. A capacitance of the series resonant capacitor C1 and the leakage inductance L1 form a primary side series resonant circuit for converting an operation of a primary side switching converter into a current resonance type operation.

According to the above description, the primary side switching converter shown in this figure obtains the current resonance type operation by the primary side series resonant circuit (L1-C1) and the partial voltage resonant operation by the partial voltage resonant circuit (Cp//L1) described above.

That is, the power supply circuit shown in this figure has the structure of a complex resonant converter in which a resonant circuit for making the primary side switching converter a resonant converter is combined with another resonant circuit.

An alternating voltage in proportion to the switching output transmitted to the primary winding N1 is induced in a secondary winding of the isolated converter transformer PIT. As the secondary winding in this case, two secondary windings N2A and N2B divided by providing a center tap are provided. The secondary windings N2A and N2B in this case have the same predetermined number of turns. The secondary windings N2A and N2B are provided with a synchronous rectifier circuit having N-channel MOS-FETs Q3 and Q4 as rectifying devices. The MOS-FETs Q3 and Q4 have for example a low withstand voltage trench structure selected therefor to obtain a low on resistance.

An output of the center tap connected with one end part of each of the secondary windings N2A and N2B is connected to a positive electrode terminal of a smoothing capacitor Co. Another end part of the secondary winding N2A is connected to a secondary side ground (a negative electrode terminal side of the smoothing capacitor Co) via a drain and a source of the MOS-FET Q3. Similarly, another end part of the secondary winding N2B is connected to the secondary side ground (the negative electrode terminal side of the smoothing capacitor Co) via a drain and a source of the MOS-FET Q4.

In such a form of connection, the MOS-FET Q3 is inserted between one end part (a side where the secondary winding N2A is formed) of the secondary winding N2 as a whole and the negative electrode terminal of the smoothing capacitor Co, and the MOS-FET Q4 is inserted between another end part (a side where the secondary winding N2B is formed) of the secondary winding N2 and the negative electrode terminal of the smoothing capacitor Co.

The MOS-FETs Q3 and Q4 thus inserted are inserted in series with respective rectified current paths including the secondary windings N2A and N2B.

Body diodes DD3 and DD4 are connected to a drain and a source of the MOS-FETs Q3 and Q4, respectively.

A driving circuit for driving the MOS-FET Q3 is formed by connecting a gate resistance Rg1 between a junction between the secondary winding N2B and the drain of the MOS-FET Q4 and a gate of the MOS-FET Q3, and connecting a resistance R11 between the gate of the MOS-FET Q3 and the secondary side ground.

Similarly, a driving circuit for driving the MOS-FET Q4 is formed by connecting a gate resistance Rg2 between a junction between the secondary winding N2A and the drain of the MOS-FET Q3 and a gate of the MOS-FET Q4 and connecting a resistance R12 between the gate of the MOS-FET Q4 and the secondary side ground.

When an on voltage is applied to a gate of a MOS-FET, a region between a drain and a source of the MOS-FET becomes equivalent to a mere resistor, so that a current flows bidirectionally. When the MOS-FET is to be made to function as a secondary side rectifying device, the current needs to flow in only a direction to charge the positive electrode terminal of the smoothing capacitor Co. If a current flows in an opposite direction, a discharge current flows from the smoothing capacitor Co to the isolated converter transformer PIT side, so that power cannot be efficiently transmitted to a load side. Also, the opposite current causes heat generation of the MOS-FET, noise and the like, and invites a switching loss on the primary side.

The driving circuits described above are circuits for switching-driving the MOS-FETs Q3 and Q4 so that current flows in only the direction to charge the positive electrode terminal of the smoothing capacitor Co (that is, from the drain to the source) on the basis of detection of a voltage of the secondary winding. That is, the synchronous rectifier circuit in this case employs a circuit configuration in which on/off driving of the MOS-FETs Q3 and Q4 is performed in synchronism with rectified current by a winding voltage detection system.

An operation of charging the smoothing capacitor Co with a rectified current obtained by double wave rectification is obtained by the synchronous rectifier circuit having the above-described circuit configuration. Thereby a secondary side direct-current output voltage Eo is obtained as a voltage across the smoothing capacitor Co. The secondary side direct-current output voltage Eo is supplied to the load side not shown in the figure, and also inputted from a branch point as a detection voltage for a control circuit 1 to be described next.

The control circuit 1 supplies a detection output corresponding to change in level of the secondary side direct-current output voltage Eo to the oscillation and drive circuit 2. The oscillation and drive circuit 2 drives the switching devices Q1 and Q2 so as to vary the switching frequency according to the supplied detection output of the control circuit 1. Varying the switching frequency of the switching devices Q1 and Q2 changes power transmitted from the primary winding N1 of the isolated converter transformer PIT to the side of the secondary windings N2A and N2B, whereby the level of the secondary side direct-current output voltage Eo is stabilized.

In response to a tendency toward a heavy load and a decrease in the secondary side direct-current output voltage Eo, for example, the switching frequency is controlled to be increased to thereby raise the secondary side direct-current output voltage Eo. On the other hand, in response to a tendency toward a light load and an increase in the secondary side direct-current output voltage Eo, for example, the switching frequency is controlled to be decreased to thereby lower the secondary side direct-current output voltage Eo.

The first embodiment meets a load condition of a low voltage and a high current under the circuit configuration of the power supply circuit shown in this figure. The condition of the low voltage and the high current in this case is a condition of the secondary side direct-current output voltage Eo=5 V and a primary side series resonance current Io as a switching current of the primary side switching converter=25 A.

Assuming such a condition, necessary parts of the power supply circuit shown in FIG. 1 are formed, and selected as follows.

Figure 2:
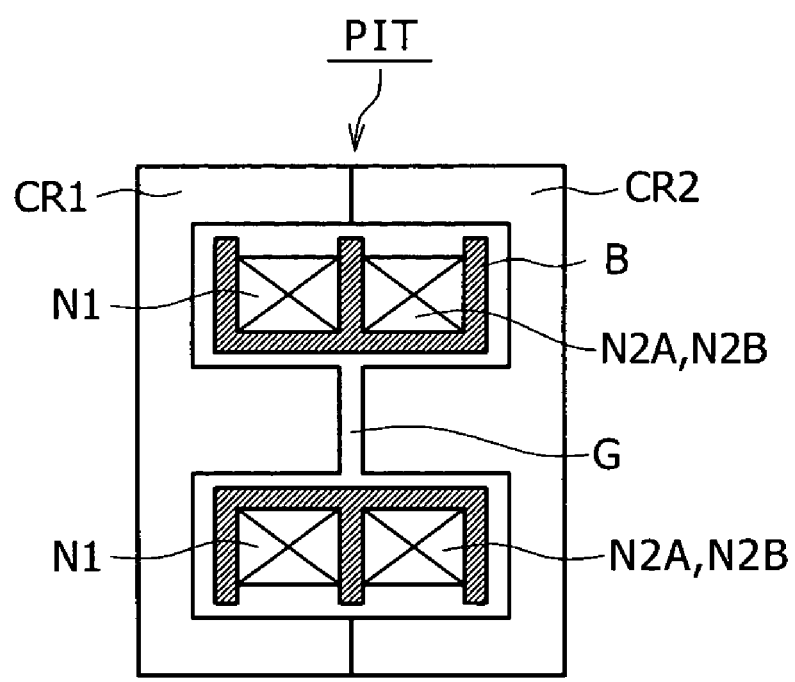
FIG. 2 is a diagram showing an example of structure of an isolated converter transformer in the first embodiment.

First, the isolated converter transformer PIT employs a structure shown in FIG. 2.

As shown in this figure, the isolated converter transformer PIT has an E-E-shaped core formed by combining E-shaped cores CR1 and CR2 made of a ferrite material with each other such that magnetic legs of the core CR1 are opposed to magnetic legs of the core CR2.

The isolated converter transformer PIT also has a bobbin B formed by resin, for example, in a form of a primary side winding part and a secondary side winding part being divided so as to be independent of each other. The primary winding N1 is wound around one winding part of the bobbin B. The secondary winding (N2A and N2B) is wound around the other winding part of the bobbin B. The bobbin B thus wound with the primary side winding and the secondary side winding is attached to the E-E-shaped core (CR1 and CR2). Thereby the primary side winding and the secondary side winding are wound around the central magnetic leg of the E-E-shaped core in different winding regions. A structure of the isolated converter transformer PIT as a whole is thus obtained. A size of the E-E-shaped core in this case is EER-35, for example.

As shown in the figure, a gap G having a gap length of about 1.5 mm, for example, is formed in the central magnetic leg of the E-E-shaped core. A coupling coefficient k is k=0.8 or less, for example, to provide a loose coupling state. That is, the coupling state is still looser than that of the isolated converter transformer PIT of the power supply circuit shown in FIG. 24 as a conventional example. Incidentally, the gap G can be formed by making the central magnetic leg of the E-shaped cores CR1 and CR2 shorter than two outer magnetic legs of the E-shaped cores CR1 and CR2.

Figure 24:
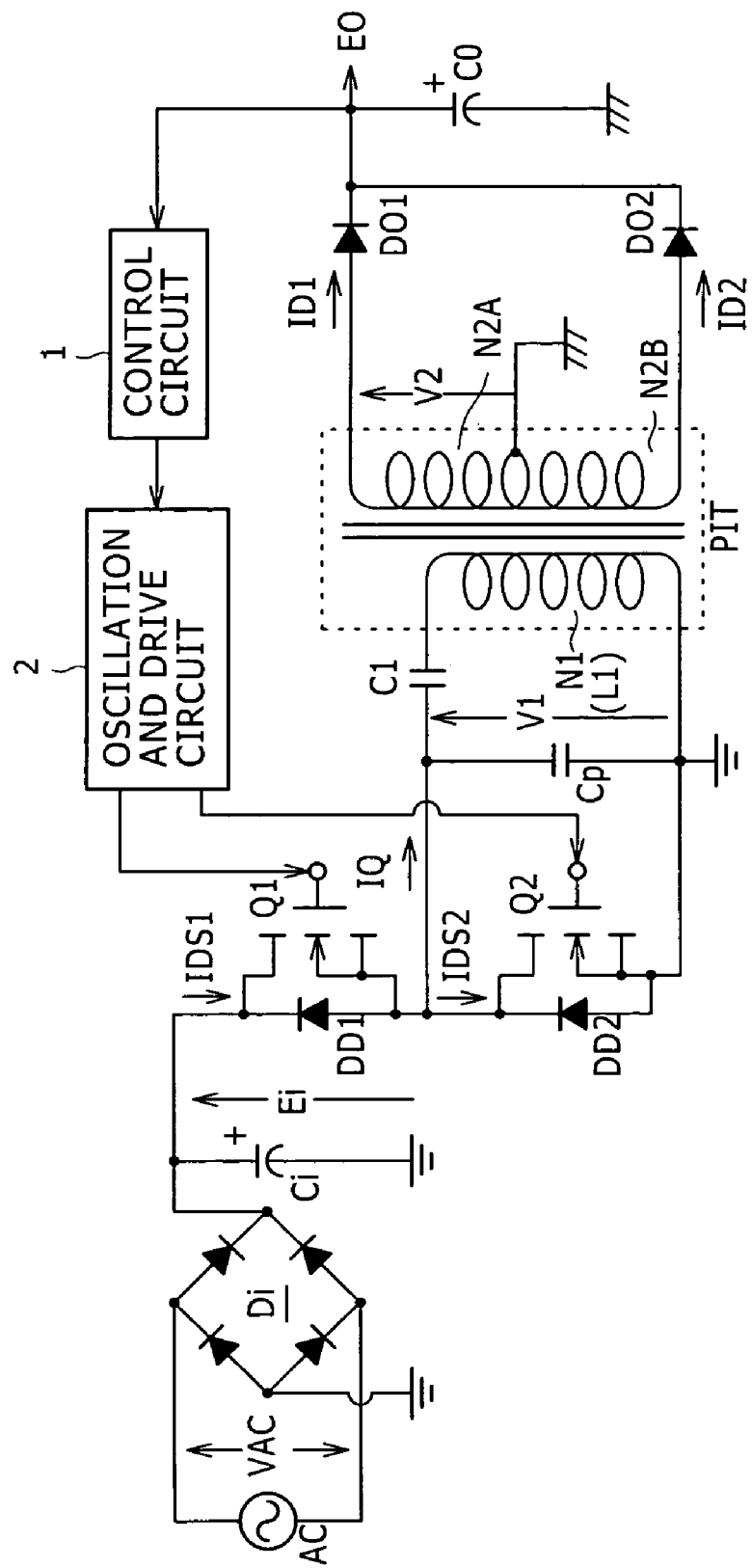
FIG. 24 is a circuit diagram showing a configuration of a conventional power supply circuit.

In addition, winding numbers (numbers of turns) of the primary winding N1 and the secondary windings N2A and N2B are set such that a voltage level induced per T (turn) of the secondary side winding is lower than that of the power supply circuit shown in FIG. 24. By setting the primary winding N1=60 T and the secondary winding N2A=N2B=6 T, for example, the voltage level induced per T (turn) of the secondary side winding is 2 V/T or lower.

With such an isolated converter transformer PIT and the thus set winding numbers of the primary winding N1 and the secondary winding (N2A and N2B), magnetic flux density at the core of the isolated converter transformer PIT is decreased, thus increasing the leakage inductance at the isolated converter transformer PIT as compared with the power supply circuit shown in FIG. 24.

Further, 0.033 µF is selected for the primary side series resonant capacitor C1. Further, 30 A/20 V is selected for the MOS-FETs Q3 and Q4 forming the secondary side synchronous rectifier circuit, and the on resistance of the MOS-FETs Q3 and Q4 is 5 mΩ.

Figure 3:
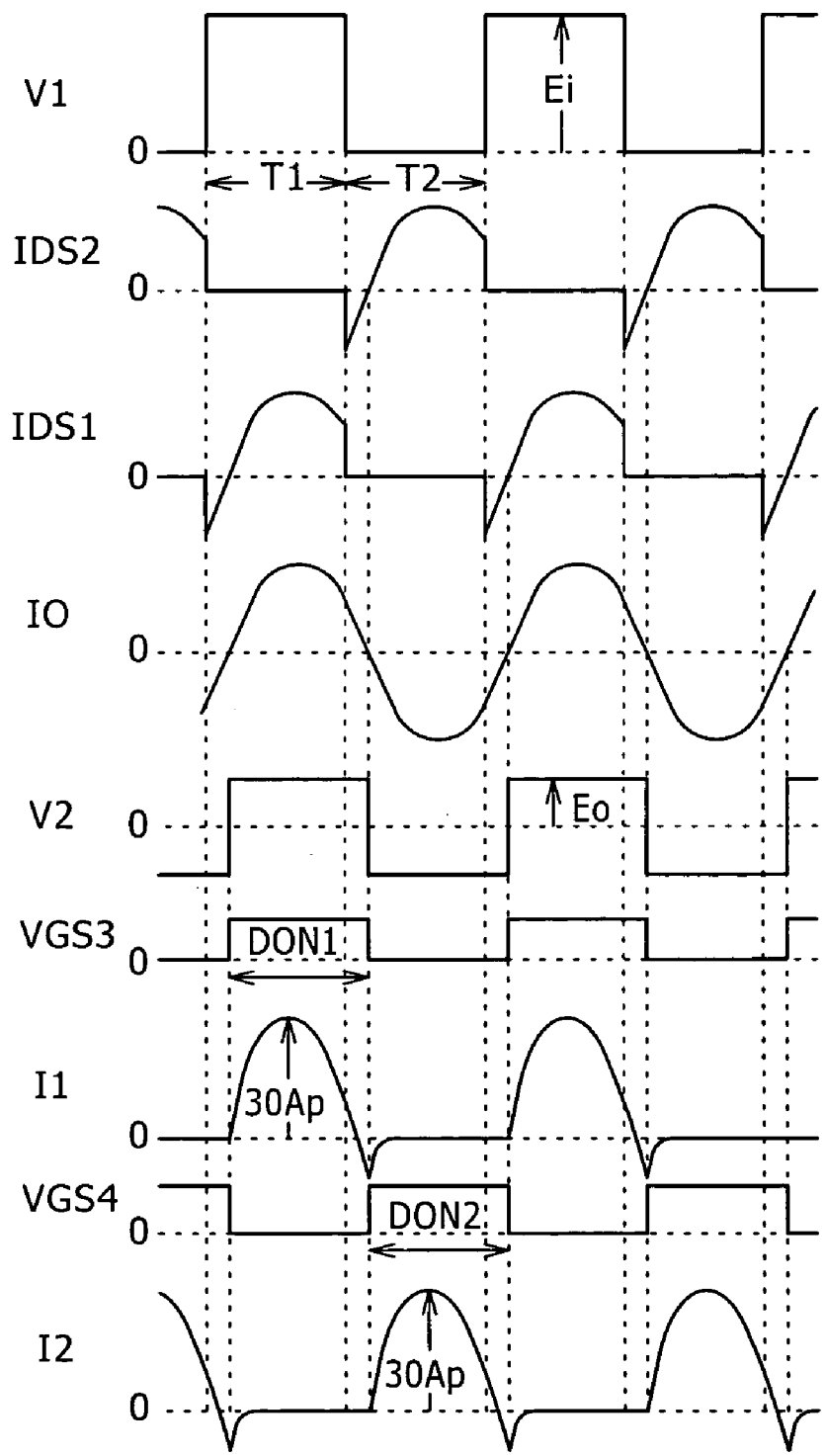
FIG. 3 is a waveform chart showing operation of the power supply circuit shown in FIG. 1 at heavy load.
Figure 4:
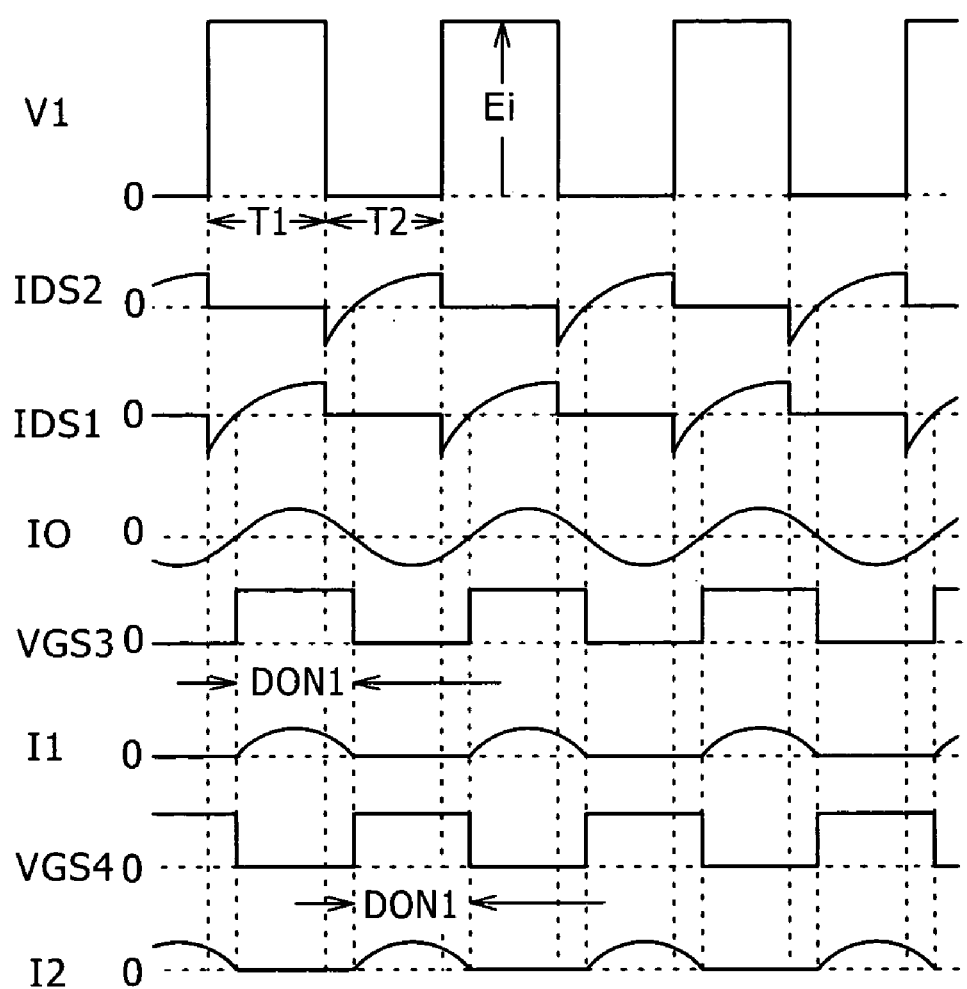
FIG. 4 is a waveform chart showing operation of the power supply circuit shown in FIG. 1 at light load.

FIG. 3 and FIG. 4 show waveforms in operation of the thus formed power supply circuit shown in FIG. 1. FIG. 3 shows operation when the alternating input voltage VAC=100 V and load power Po=125 W. FIG. 4 shows operation when the alternating input voltage VAC=100 V and the load power Po=25 W. In a range of load power handled by the power supply circuit shown in FIG. 1, the load power Po=125 W represents a condition of a heavy load, and the load power Po=25 W represents a condition of a light load.

A voltage V1 across the switching device Q2 in the waveform chart of FIG. 3 corresponds to an on/off state of the switching device Q2. Specifically, the voltage V1 is a rectangular wave, having a zero level during a period T2 when the switching device Q2 is turned on and being clamped at a predetermined level during a period T1 when the switching device Q2 is turned off. A switching current IDS2 flowing through the switching device Q2//the damper diode DD2 has a waveform such that during the period T2, the switching current IDS2 flows through the damper diode DD2 and is thus of a negative polarity at a time of turn-on, and is then inverted to flow through the drain and the source of the switching device Q2 with a positive polarity, and such that the switching current IDS2 is at a zero level during the off period T1.

The switching device Q1 performs switching so as to be turned on/off alternately with the switching device Q2. Therefore a switching current IDS1 flowing through the switching device Q1//the damper diode DD1 has a waveform shifted 180° in phase with respect to the switching current IDS2. Also, though not shown in the figure, a voltage across the switching device Q1 has a waveform shifted 180° in phase with respect to the voltage V1 across the switching device Q2.

A primary side series resonance current Io flowing through the primary side series resonant circuit (C1-L1) connected between the switching output point of the switching devices Q1 and Q2 and the primary side ground is a synthesis of the switching current IDS1 and the switching current IDS2. Thus the primary side series resonance current Io has a sinusoidal waveform as shown in the figure. A comparison between this waveform and the waveform of the primary side series resonance current Io of the conventional power supply circuit shown in FIG. 24 (see FIG. 25) indicates that the primary side series resonance current Io of the present embodiment scarcely includes a sawtooth wave component generated by an exciting inductance of the primary winding N1. This is because the looser coupling state obtained by the coupling coefficient of the isolated converter transformer PIT increases the leakage inductance L1 of the primary winding N1, and correspondingly the exciting inductance of the primary winding N1 is decreased relatively.

Such a waveform of the primary side series resonance current Io being obtained, a voltage V2 of the secondary windings N2A and N2B has a waveform such that in response to inversion of the primary side series resonance current Io of positive polarity/negative polarity, the voltage V2 is similarly inverted, and clamped at an absolute value level corresponding to the secondary side direct-current output voltage Eo.

Figure 25:
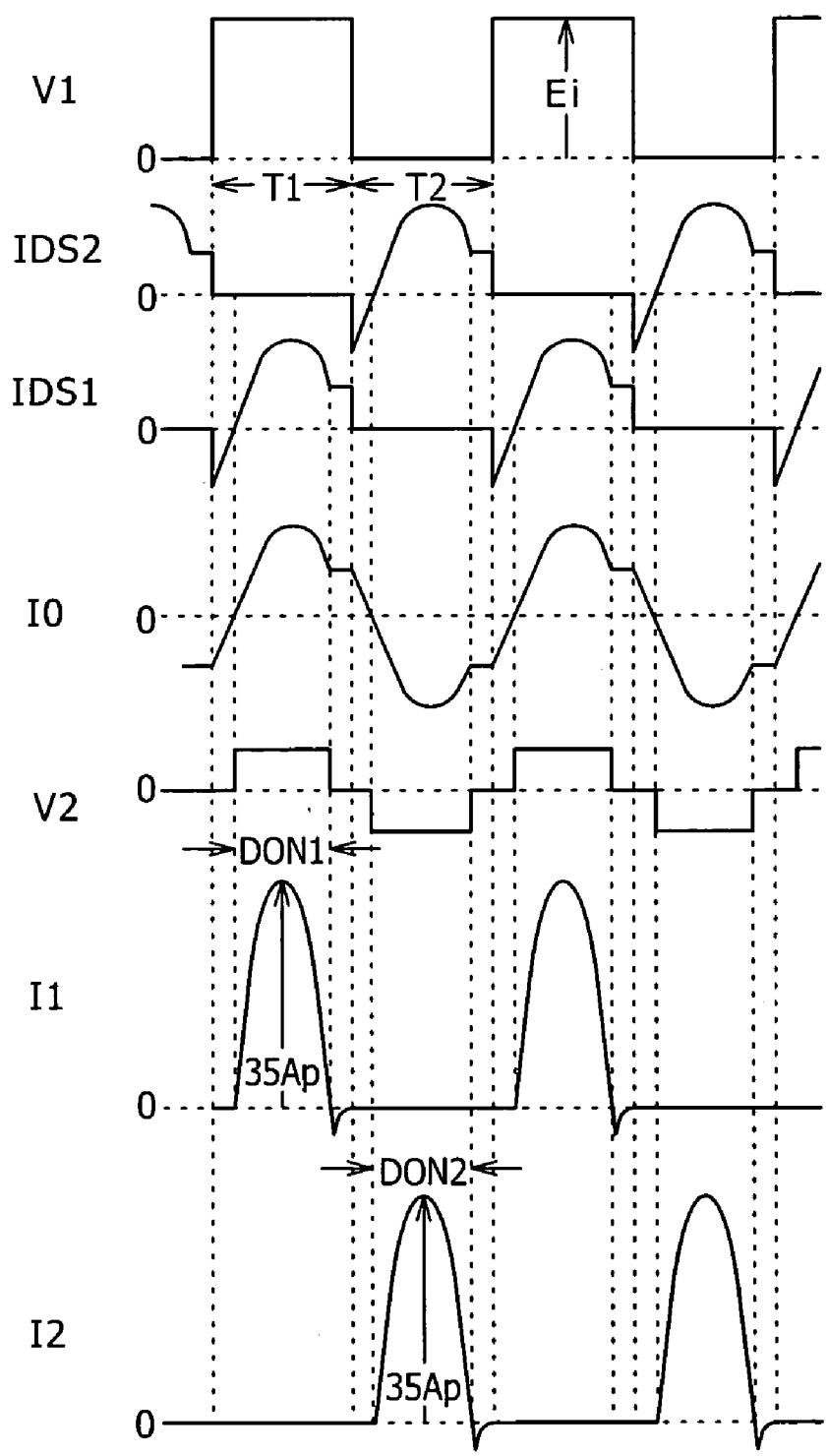
FIG. 25 is a waveform chart showing operation of the power supply circuit shown in FIG. 24 at heavy load.
Figure 26:
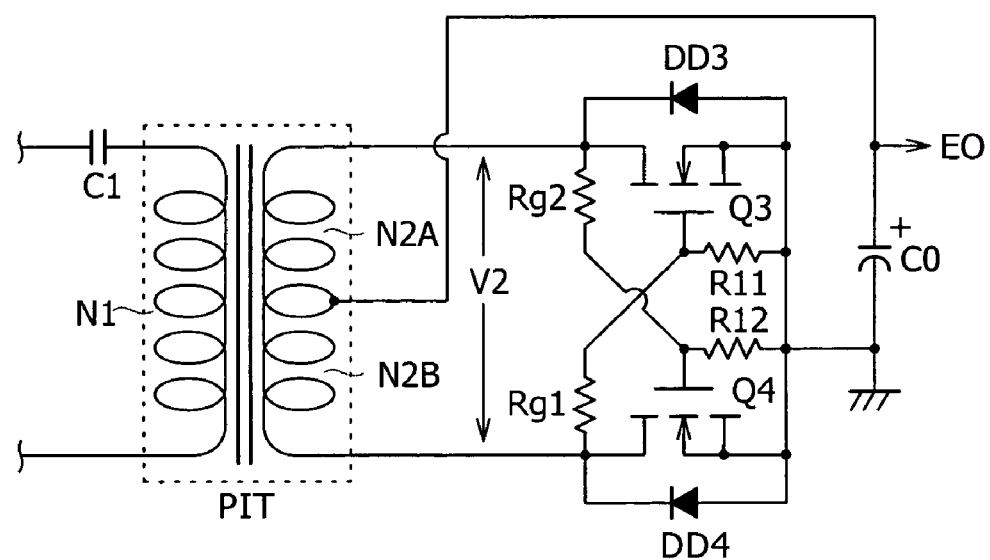
FIG. 26 is a circuit diagram showing a configuration on a secondary side when the power supply circuit shown in FIG. 24 has a synchronous rectifier circuit of a winding voltage detection system.
Figure 27:
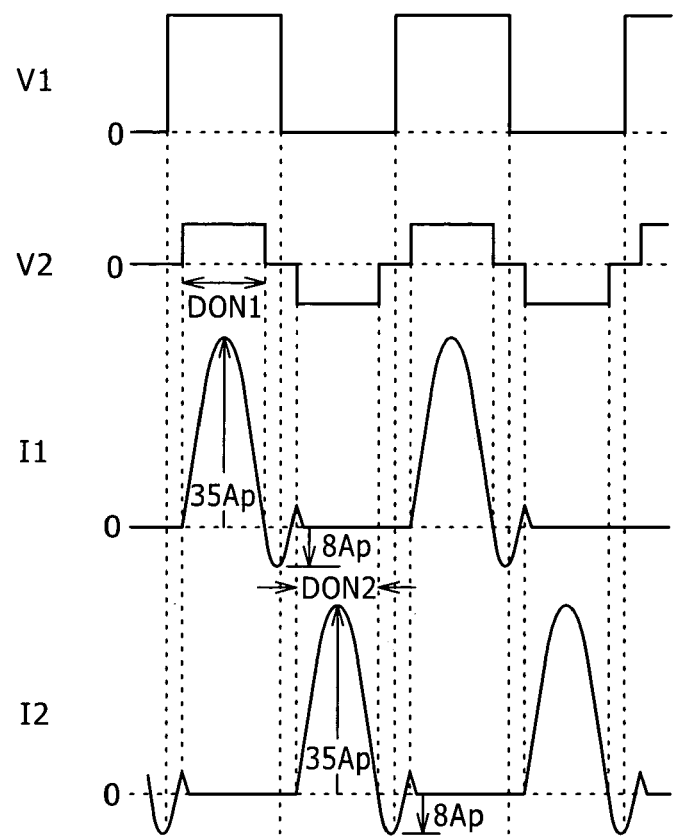
FIG. 27 is a waveform chart showing operation at heavy load when the secondary side configuration shown in FIG. 26 is employed.
Figure 28:
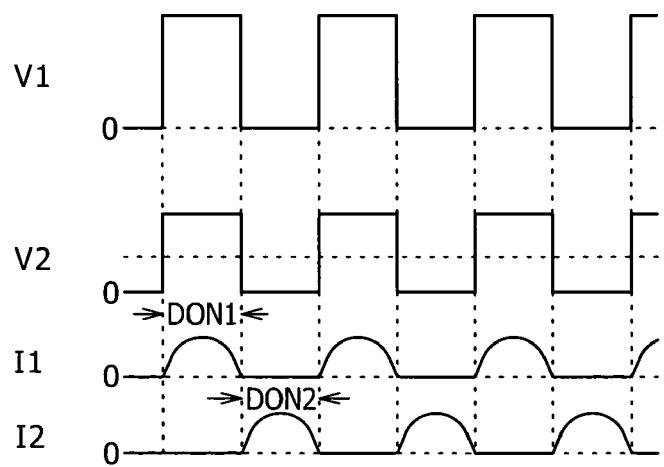
FIG. 28 is a waveform chart showing operation at light load when the secondary side configuration shown in FIG. 26 is employed.

As is understood from comparison with the voltage V2 shown in FIG. 25, the voltage V2 shown in FIG. 3 has a waveform inverted to positive polarity/negative polarity without a zero level interval being interposed.

In the secondary side synchronous rectifier circuit employing a voltage detection system, the driving circuits including the resistances Rg1 and R11 and the resistances Rg2 and R12, respectively, detect the voltage V2, and then output a gate voltage at an on level to the MOS-FETs Q3 and Q4, respectively. Thus gate-to-source voltages VGS3 and VGS4 generated between the gate and the source of the MOS-FETs Q3 and Q4 have an on voltage level corresponding to a pulse period of positive polarity and negative polarity, respectively, of the voltage V2.

The MOS-FET Q3 is turned on to charge the smoothing capacitor Co with a rectified current I1 during a period DON1 during which the gate-to-source voltage VGS3 rises to be of positive polarity. Similarly, the MOS-FET Q4 is turned on to charge the smoothing capacitor Co with a rectified current I2 during a period DON2 during which the gate-to-source voltage VGS4 rises to be of positive polarity.

This indicates that double-wave rectification operation, in which the smoothing capacitor Co is charged during each of the periods when the secondary winding voltage V2 is positive and negative, is obtained as rectification operation.

As described above, the secondary winding voltage V2 is inverted to positive polarity/negative polarity without a zero level interval being interposed. Accordingly periods when the gate-to-source voltages VGS3 and VGS4 are of positive polarity as an on voltage are continuous with each other, and thus the rectified currents I1 and I2 flow as a continuous charging current for charging the smoothing capacitor Co.

That is, even when the switching frequency is controlled to be decreased at heavy load, the present embodiment obtains a continuous mode of the secondary side rectified current. Incidentally, the rectified currents I1 and I2 in this case are 30 Ap, which is less than the conventional rectified currents I1 and I2 shown in FIG. 25, for example. This is because a period of conduction of the rectified currents is extended as compared with the conventional one within a period corresponding to the same switching frequency, for example.

As is understood from the description so far, the continuous mode is obtained even under the condition of the heavy load because the coupling coefficient of the isolated converter transformer PIT is lowered to about 0.8 by the setting of the gap length to provide a looser coupling state and the winding numbers (numbers of turns) of the primary winding N1 and the secondary windings N2A and N2B are set such that the voltage level induced per turn of the secondary winding is decreased to about 2 V/T, for example, whereby magnetic flux density at the core of the isolated converter transformer PIT is decreased to a required value or lower.

As described in the conventional example, since the synchronous rectifier circuit uses MOS-FETs with a low on resistance and a low withstand voltage as a rectifying device, the synchronous rectifier circuit can reduce a conduction loss as compared with the case where a diode device is used as a rectifying device.

However, when the secondary side rectified current flows in a discontinuous mode in the case where the synchronous rectifier circuit employs the winding voltage detection system, the MOS-FETs maintain an on state even at the zero level of the charging current for charging the smoothing capacitor Co, and a current in an opposite direction flows, which causes ineffective power.

When this ineffective power is to be eliminated, a synchronous rectifier circuit using a rectified current detection system is employed. The rectified current detection system, however, requires a driving circuit system including a current transformer and a comparator, and the like, thus resulting in a complex large-scale circuit configuration.

On the other hand, in the present embodiment, since the secondary side rectified current is in the continuous mode even at the time of a heavy load, the synchronous rectifier circuit using the voltage detection system does not cause ineffective power during a period of discontinuity of current as described above.

Thus, the present embodiment uses the voltage detection system for the synchronous rectifier circuit to suppress increase in the scale of the circuit by a simple circuit configuration and further avoid increase in cost. In addition, the present embodiment solves the problem of decrease in power conversion efficiency due to ineffective power during a period of discontinuity of current.

FIG. 4 shows operation of the same parts as in FIG. 3 at light load (Po=25 W).

As is understood from the description so far, the power supply circuit shown in FIG. 1 performs constant-voltage control by controlling the switching frequency in order to stabilize the secondary side direct-current output voltage Eo. When the secondary side direct-current output voltage is increased under a condition of a light load, the constant-voltage control is performed to increase the switching frequency and thus decrease the secondary side direct-current output voltage, whereby the secondary side direct-current output voltage Eo is stabilized.

In such a light-load condition, the secondary side winding voltage V2 is inverted in substantially the same timing as the voltage V1 across the switching device Q2 shown in the figure. Accordingly, the secondary side rectified currents I1 and I2 flow so as to continuously charge the smoothing capacitor Co without a period of discontinuity between periods DON1 and DON2. That is, a continuous mode is obtained.

Figure 5:
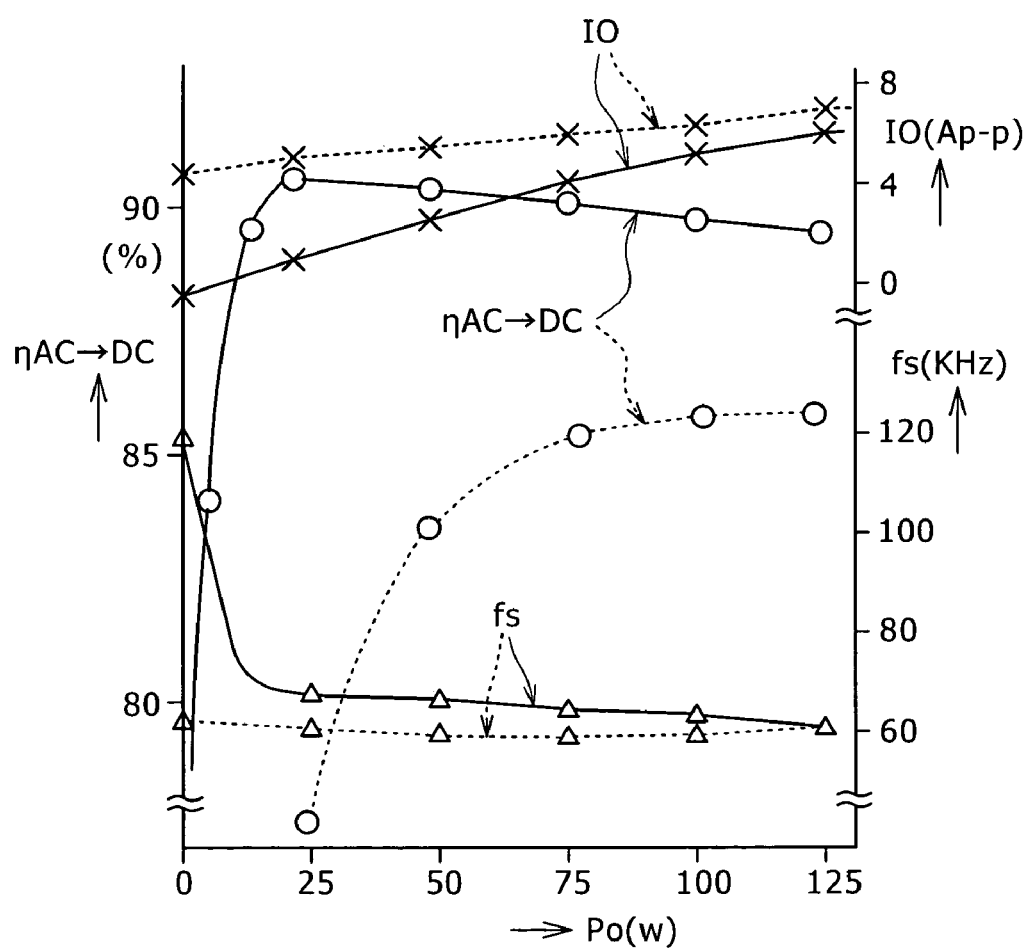
FIG. 5 is a diagram showing characteristics of switching frequency, primary side series resonance current level, and AC-to-DC power conversion efficiency with respect to variation in a load on the power supply circuit shown in FIG. 1.

FIG. 5 shows characteristics of AC-to-DC power conversion efficiency ($\eta AC \rightarrow DC$), primary side series resonance current level Io, and switching frequency fs with respect to variation in load power as a comparison between the power supply circuit shown in FIG. 1 having the configuration described so far and the power supply circuit of FIG. 24 as a conventional example. Characteristics of the power supply circuit of FIG. 1 are represented by solid lines, and characteristics of the power supply circuit of FIG. 24 are represented by broken lines.

First, according to FIG. 5, the switching frequency is varied so as to be decreased with increase in load power in both the circuits of FIG. 1 and FIG. 24, indicating that both the circuits perform stabilizing operation by controlling the switching frequency.

The AC-to-DC power conversion efficiency (SAC DC) of the circuit shown in FIG. 1 is higher than that of the power supply circuit shown in FIG. 24 over a range of load power Po=0 W to 125 W. In the circuit shown in FIG. 24, $\eta AC \rightarrow DC$=85.3% at the time of the load power Po=125 W, and $\eta AC \rightarrow DC$=77.5% at the time of Po=25 W, whereas in the circuit shown in FIG. 1, $\eta AC \rightarrow DC$=89.5% at the time of the load power Po=125 W, and $\eta AC \rightarrow DC$=90.5% at the time of Po=25 W. That is, the AC-to-DC power conversion efficiency ($\eta AC \rightarrow DC$) is improved by 4.2 percentage points at the time of the load power Po=125 W, and is improved by 13 percentage points at the time of Po=25 W. A corresponding alternating-current input power is reduced by 6.9 W at the time of the load power Po=125 W, and is reduced by 4.7 W at the time of Po=25 W.

Such improvements in the power conversion efficiency are also indicated by the fact that the level of the primary side series resonance current Io shown in FIG. 5 of the circuit shown in FIG. 1 is lower than that of the circuit shown in FIG. 24 over the range of the load power Po=0 W to 125 W.

The characteristic of the power conversion efficiency shown in FIG. 5 is equal to that of a case where a synchronous rectifier circuit using a rectified current detection system is employed on the secondary side in combination with the primary side configuration shown in FIG. 24. However, as described above, the power supply circuit shown in FIG. 1 employs the winding voltage detection system for the configuration of the synchronous rectifier circuit, and therefore the circuit configuration of the power supply circuit shown in FIG. 1 is simpler.

Figure 6:
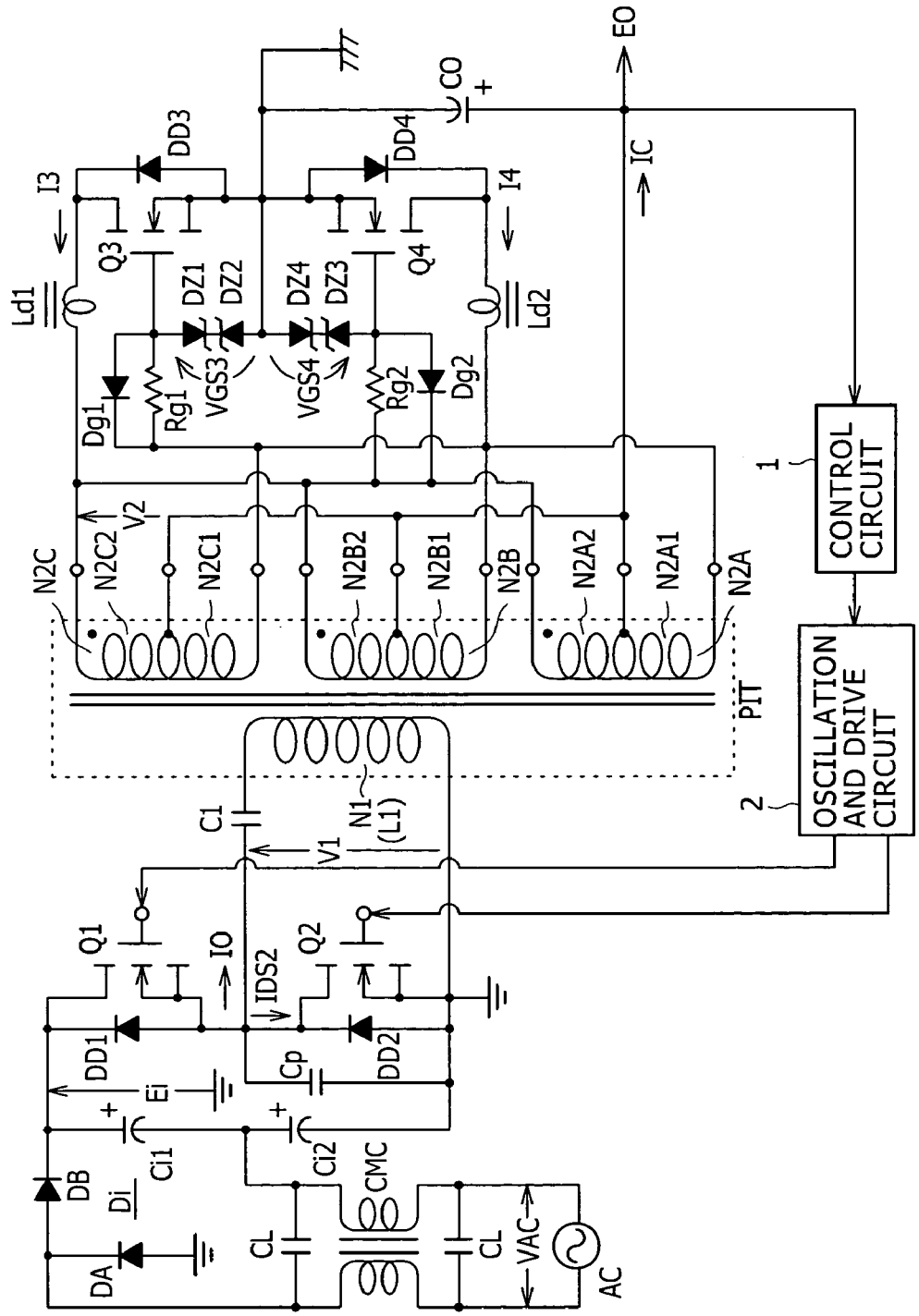
FIG. 6 is a circuit diagram illustrating a configuration of a power supply circuit that can be formed on the basis of the power supply circuit shown in FIG. 1.

Next, FIG. 6 shows an example of a configuration to meet a condition of an even heavier load on the basis of the configuration of the circuit shown in FIG. 1.

Incidentally, in FIG. 6, parts already described with reference to FIG. 1 are identified by the same reference numerals, and description thereof will be omitted.

First, in a power supply circuit shown in this figure, a noise filter is formed by filter capacitors CL, CL, and a common mode choke coil CMC for a commercial alternating-current power supply AC.

In this case, a voltage doubler rectifier circuit formed by two smoothing capacitors Ci1 and Ci2 and a rectifier circuit unit Di including a rectifier diode DA and a rectifier diode DB is provided in a stage succeeding the noise filter. The voltage doubler rectifier circuit generates a rectified and smoothed voltage Ei (direct-current input voltage) whose level is equal to twice that of an alternating input voltage VAC, as a voltage across the smoothing capacitors Ci1 and Ci2.

As described above, the power supply circuit shown in this figure meets the condition of a heavier load than the circuit shown in FIG. 1.

Under the condition of a heavier load, or the condition requiring a relatively high load current, a current level flowing through a circuit on a side of a primary side switching converter is also increased. This increases a switching loss and the like, and thus decreases power conversion efficiency.

Accordingly, the circuit of FIG. 6 employs the voltage doubler rectifier circuit as a rectifier circuit system for generating a direct-current input voltage. It is thereby possible to reduce the current level flowing through the primary side switching converter to about ½ of that in the case where the rectified and smoothed voltage Ei whose level is equal to that of the alternating input voltage VAC is supplied by the full-wave rectification as shown in FIG. 1. That is, the switching loss caused by the primary side switching converter is thereby reduced.

Also in this case, a current resonant converter supplied with the direct-current input voltage and switching (interrupting) the direct-current input voltage has a switching circuit formed by connecting two MOS-FET switching devices Q1 and Q2 to each other by half-bridge coupling.

Also in this case, a partial resonant capacitor Cp is connected in parallel with the switching device Q2 between a drain and a source of the switching device Q2. The power supply circuit is further provided with an oscillation and drive circuit 2 for switching-driving the switching devices Q1 and Q2.

Also in this case, a primary side series resonant capacitor C1 is connected in series with a primary winding N1 of an isolated converter transformer PIT. Thus a configuration of a complex resonant converter is employed.

In this case, three windings, that is, a secondary winding N2A, a secondary winding N2B, and a secondary winding N2C are wound as shown in the figure as a secondary winding of the isolated converter transformer PIT.

Each of the secondary windings N2A, N2B, and N2C is divided into two winding parts as shown in the figure by providing a center tap. In this case, a winding part including an end part at a winding-start of the secondary winding N2A is a winding part N2A1, and a winding part including an end part at a winding-end of the secondary winding N2A is a winding part N2A2. A winding part including an end part at a winding-start of the secondary winding N2B is a winding part N2B1, and a winding part including an end part at a winding-end of the secondary winding N2B is a winding part N2B2. A winding part including an end part at a winding-start of the secondary winding N2C is a winding part N2C1, and a winding part including an end part at a winding-end of the secondary winding N2C is a winding part N2C2.

The winding parts N2A1, N2A2, N2B1, N2B2, N2C1, and N2C2 in the secondary windings N2A, N2B, and N2C each have the same predetermined number of turns.

A synchronous rectifier circuit formed by MOS-FETs Q3 and Q4 is provided for the secondary windings N2A, N2B, and N2C.

In this case, a center tap output of each of the secondary windings N2A, N2B, and N2C is connected to a positive electrode terminal of a smoothing capacitor Co.

The end part at the winding-end of each of the secondary windings N2A, N2B, and N2C in this case is connected to a secondary side ground (a negative electrode terminal side of the smoothing capacitor Co) via an inductor Ld1 and a drain and a source of the MOS-FET Q3.

The end part at the winding-start of each of the secondary windings N2A, N2B, and N2C in this case is connected to the secondary side ground (the negative electrode terminal side of the smoothing capacitor Co) via an inductor Ld2 and a drain and a source of the MOS-FET Q4.

In such a form of connection, the MOS-FET Q3 and the MOS-FET Q4 are respectively inserted between one end part of each of the secondary windings N2A, N2B, and N2C and the negative electrode terminal of the smoothing capacitor Co, and between the other end part of each of the secondary windings N2A, N2B, and N2C and the negative electrode terminal of the smoothing capacitor Co.

The MOS-FET Q4 is inserted in series in a rectified current path including the winding parts N2A1, N2B1, and N2C1 of the secondary windings N2A, N2B, and N2C. The MOS-FET Q3 is inserted in series in a rectified current path including the winding parts N2A2, N2B2, and N2C2 of the secondary windings N2A, N2B, and N2C.

In this case, the inductor Ld2 is inserted in series between each of the winding-start end part of the secondary windings N2A, N2B, and N2C and the drain of the MOS-FET Q4 in the rectified current path including the winding parts N2A1, N2B1, and N2C1. Similarly, the inductor Ld1 is inserted in series between each of the winding-end end part of the secondary windings N2A, N2B, and N2C and the drain of the MOS-FET Q3 in the rectified current path including the winding parts N2A2, N2B2, and N2C2.

A driving circuit for driving the MOS-FET Q3 is formed by connecting a gate resistance Rg1 between each of the winding-start end part of the secondary windings N2A, N2B, and N2C and a gate of the MOS-FET Q3. Similarly, a driving circuit for driving the MOS-FET Q4 is formed by connecting a gate resistance Rg2 between each of the winding-end end part of the secondary windings N2A, N2B, and N2C and a gate of the MOS-FET Q4.

Thus, an alternating voltage induced in each of the winding part N2A1, the winding part N2B1, and the winding part N2C1 is detected by the gate resistance Rg1 and allowed to conduct to the MOS-FET Q3. Also, an alternating voltage induced in each of the winding part N2A2, the winding part N2B2, and the winding part N2C2 is detected by the gate resistance Rg2 and allowed to conduct to the MOS-FET Q4.

Thus, also in this case, the driving circuits switching-drive the MOS-FETs Q3 and Q4 such that only current in a direction to charge the positive electrode terminal of the smoothing capacitor Co flows.

As in the case of FIG. 1, an operation of charging the smoothing capacitor Co with a rectified current obtained by double wave rectification is obtained by the secondary side synchronous rectifier circuit having the above-described configuration.

Incidentally, in this case, a Schottky diode Dg1 and a Schottky diode Dg2 are connected in directions shown in the figure in parallel with the gate resistances Rg1 and Rg2 forming the driving circuit system for the MOS-FET Q3 and the MOS-FET Q4, respectively. These Schottky diodes Dg1 and Dg2 form a path for discharging an accumulated charge of a gate input capacitance of the MOS-FETs Q3 and Q4 at the time of turning off the MOS-FETs Q3 and Q4, as later described.

Further, in this case, a Zener diode Dz1 and a Zener diode Dz2 are inserted between the gate and the source of the MOS-FET Q3 as shown in the figure. Similarly, a Zener diode Dz3 and a Zener diode Dz4 are inserted between the gate and the source of the MOS-FET Q4. These Zener diodes form an overvoltage protection circuit for the MOS-FETs Q3 and Q4.

A potential corresponding to a withstand voltage level of the MOS-FETs Q3 and Q4 is selected as a Zener potential (breakdown potential) of such a Zener diode Dz. Thus, in response to an increase in a gate-to-source potential of the MOS-FETs Q3 and Q4 to a level higher than the withstand voltage level, the Zener diodes Dz conduct to protect the MOS-FETs Q3 and Q4.

For example, a Zener diode having a Zener potential=±20 V is selected as the Zener diode Dz in this case. In addition, for example, the Zener diodes Dz1 and Dz2 and the Zener diodes Dz3 and Dz4 are provided so as to be included with the MOS-FET Q3 and the MOS-FET Q4, respectively.

As described above, the power supply circuit shown in FIG. 6 has the inductor Ld1 inserted between each of the winding-end end part of the secondary windings N2A, N2B, and N2C and the drain of the MOS-FET Q3. Similarly, the power supply circuit shown in FIG. 6 has the inductor Ld2 inserted between each of the winding-start end part of the secondary windings N2A, N2B, and N2C and the drain of the MOS-FET Q4.

These inductors Ld1 and Ld2 in FIG. 6 have a relatively low inductance of for example 1.0 μH or lower set thereto.

Incidentally, in order to obtain the low inductance, it is considered that a bead core obtained by forming for example an amorphous magnetic substance or a magnetic substance of a ferrite material or the like into a tubular shape is used as the inductors Ld1 and Ld2. For example, when a lead wire as a drain electrode terminal of the MOS-FETs Q3 and Q4 is provided so as to be passed through such a bead core, it is possible to omit a space for mounting parts as the inductors Ld1 and Ld2 on a printed board.

Alternatively, it is possible to form a copper foil pattern to be wired to the drain electrode of the MOS-FETs Q3 and Q4 in a spiral form on the printed board and obtain the low inductance of the inductors Ld1 and Ld2 by the spiral form. This provides an advantage of being able to form the inductor Ld simultaneously with manufacturing of the printed wiring board.

The circuit of FIG. 6 also meets the condition of a low voltage and a high current. The condition of the low voltage and the high current in this case is a condition of a secondary side direct-current voltage Eo=5 V and a primary side series resonance current Io as a switching current of the primary side switching converter =30 A.

Assuming such a condition, necessary parts of the power supply circuit shown in FIG. 6 are formed, and selected as follows.

Figure 7A:
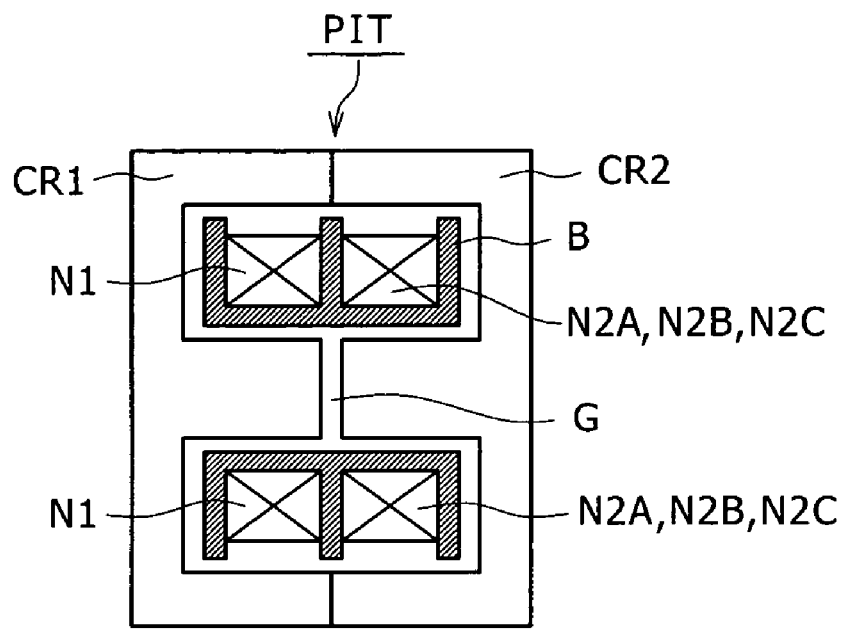
FIG. 7A is a diagram showing an example of structure of an isolated converter transformer in the power supply circuit shown in FIG. 6.
Figure 7B:
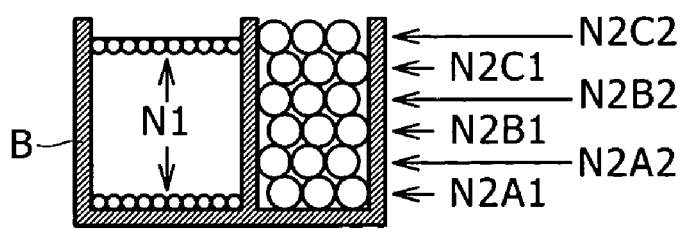
FIG. 7B is a diagram showing an example of structure of the isolated converter transformer in the power supply circuit shown in FIG. 6.

First, the isolated converter transformer PIT employs a structure shown in FIGS. 7A and 7B.

FIG. 7A is a sectional view of the isolated converter transformer PIT. As shown in FIG. 7A, the isolated converter transformer PIT in this case has the secondary windings N2A, N2B, and N2C wound around a secondary side winding part on the basis of the structure shown in FIG. 2.

Further, also in this case, a gap G having a gap length of about 1.5 mm, for example, is formed in a central magnetic leg of an E-E-shaped core. Thus, also in this case, a coupling coefficient k is k=0.8 or less to provide a loose coupling state.

FIG. 7B shows a section of the windings wound around a bobbin B within the isolated converter transformer PIT.

As shown in FIG. 7B, the primary winding N1 is wound around one winding part of the bobbin B. The primary winding N1 in this case is wound by rough winding by a number of turns of 80 T, for example.

The secondary windings N2A, N2B, and N2C are wound around another winding part of the bobbin B by a predetermined number of turns from an inner side to an outer side as shown in the figure in order of the winding parts N2A1, N2A2, N2B1, N2B2, N2C1, and N2C2.

Figure 11:
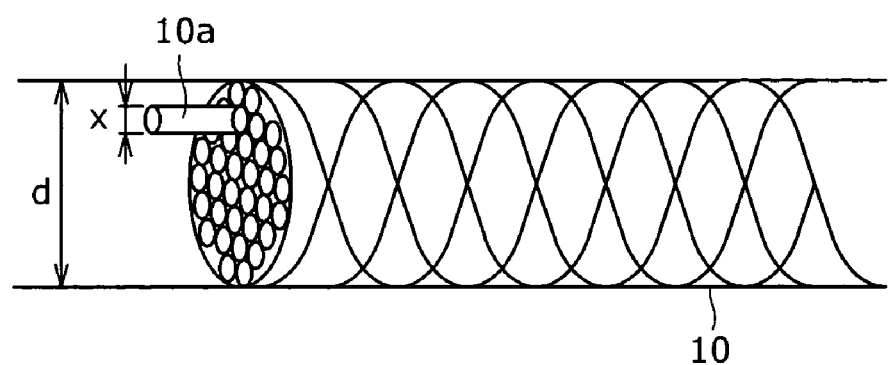
FIG. 11 is a diagram showing an example of structure of a litz wire used as a wire material for a secondary winding of an isolated converter transformer in switching power supply circuits according to a second embodiment and a third embodiment of the present invention.

In this case, a litz wire 10 as shown in FIG. 11, for example, is selected as a wire material for each of the winding parts of the secondary winding N2. Specifically, a litz wire formed by bundling and twisting together a plurality of elemental wires i1a as shown in FIG. 11, the elemental wires 10a being formed by copper wires that have been subjected to an insulation coating process using a polyurethane coating, for example, is used as the litz wire 10 shown in FIG. 11. As is well known, the litz wire selected as the wire material for the secondary winding has an advantage of being able to reduce a so-called skin effect, which occurs when a high-frequency rectification current flows through each secondary winding, for example.

In this case, as shown in FIG. 7B, the winding parts N2A1, N2A2, N2B1, N2B2, N2C1, and N2C2 formed by such a litz wire are wound by rough winding around the same axis of the bobbin B.

In this case, N2A1=N2A2=N2B1=N2B2=N2C1=N2C2=3 T (turns). In this case, a litz wire formed by twisting together a bundle of 100 elemental wires 10a having a wire diameter X=0.1 mφ shown in FIG. 11, for example, is used as the above-described litz wire. For example, such a litz wire has a wire diameter d=1.0 mφ and a cross-sectional area s=0.785 mm².

Also in the circuit shown in FIG. 6, winding numbers of the primary winding N1 and the secondary winding (N2A, N2B, and N2C) are set as described above so that a voltage level induced per T (turn) of the secondary side winding is lower than that of the power supply circuit shown in FIG. 24. That is, by setting the primary winding N1=80 T and the secondary winding N2A=N2B=N2C=6 T (N2A1=N2A2=N2B1=N2B2=N2C1=N2C2=3 T) as described above, the voltage level induced per T (turn) of the secondary side winding is reduced to 2 V/T or lower, for example.

That is, also in this case, a loose coupling state is provided by the coupling coefficient k=0.8 or less obtained by the setting of the gap length to about 1.5 mm as described above, and the voltage level induced per turn of the secondary side winding is decreased to 2 V/T or lower, whereby magnetic flux density is decreased.

Figure 8:
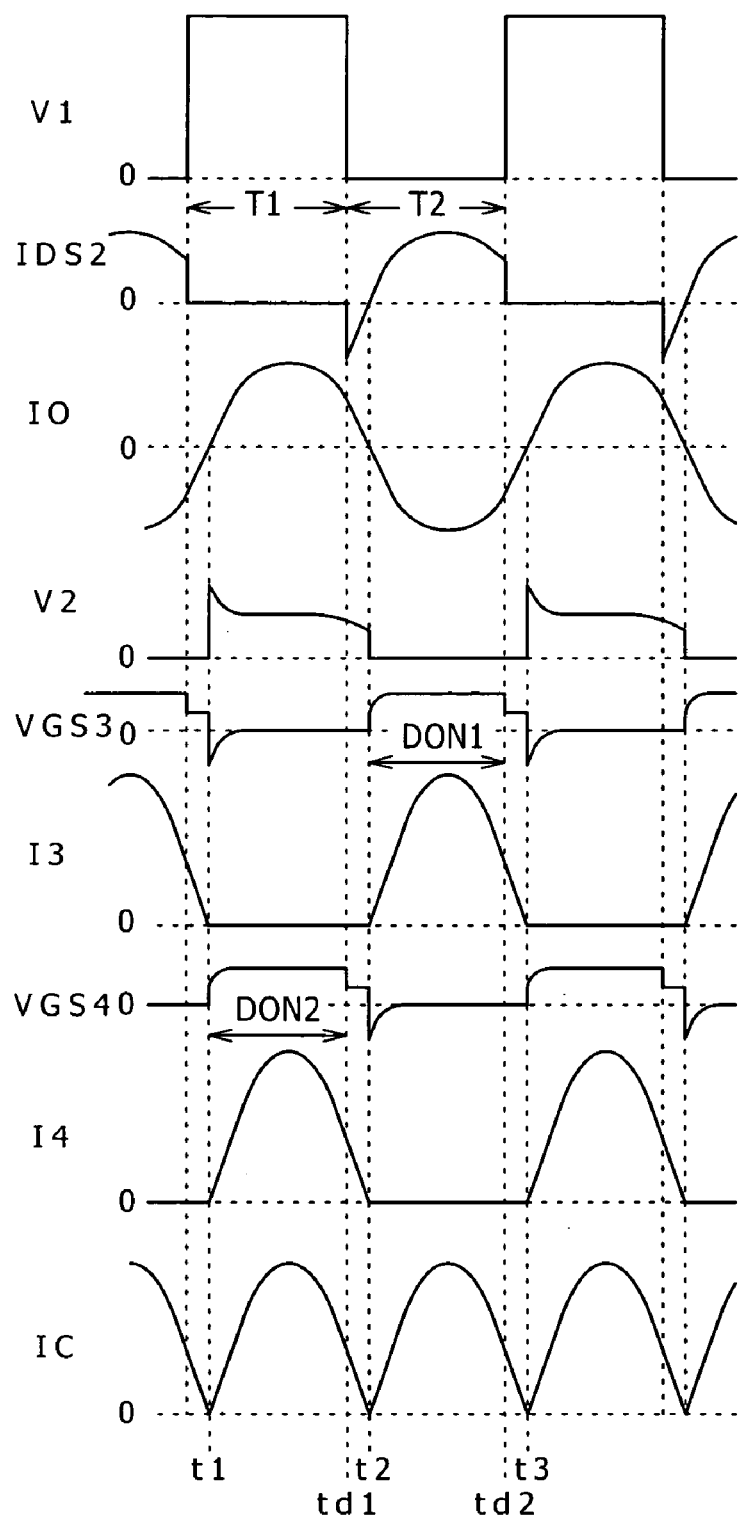
FIG. 8 is a waveform chart showing operation of the power supply circuit shown in FIG. 6 at heavy load.
Figure 9:
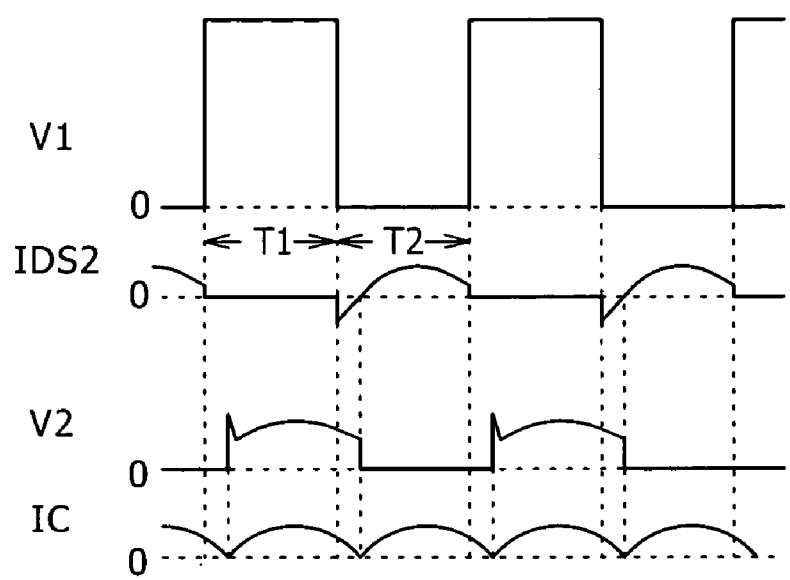
FIG. 9 is a waveform chart showing operation of the power supply circuit shown in FIG. 6 at light load.

FIG. 8 and FIG. 9 show waveforms in operation of the power supply circuit shown in FIG. 6. FIG. 8 shows operation when the alternating input voltage VAC=100 V and load power Po=150 W. FIG. 9 shows operation when the alternating input voltage VAC=100 V and the load power Po=25 W. In a range of load power handled by the power supply circuit shown in FIG. 6, the load power Po=150 W represents a condition of a heavy load, and the load power Po=25 W represents a condition of a light load.

Also in this case, a voltage V1 across the switching device Q2 in the waveform chart of FIG. 8 corresponds to an on/off state of the switching device Q2. Specifically, the voltage V1 is a rectangular wave, having a zero level during a period T2 when the switching device Q2 is turned on and being clamped at a predetermined level during a period T1 when the switching device Q2 is turned off. A switching current IDS2 flowing through the switching device Q2//the damper diode DD2 has a waveform such that the switching current IDS2 flows through the damper diode DD2 and is thus of a negative polarity at the time of turn-on, and is then inverted to flow through the drain and the source of the switching device Q2 with a positive polarity, and such that the switching current IDS2 is at a zero level during the off period T1.

A primary side series resonance current Io flowing through the primary side series resonant circuit (C1-L1) in this case has a sinusoidal waveform as shown in the figure. This is because also in the circuit of FIG. 6, the looser coupling state obtained by the coupling coefficient of the isolated converter transformer PIT increases the leakage inductance L1 of the primary winding N1, and correspondingly the exciting inductance of the primary winding N1 is decreased relatively.

Such a waveform of the primary side series resonance current Io being obtained, a voltage V2 obtained at the winding part N2C2 of the secondary winding N2C has a waveform that corresponds to a cycle of the primary side series resonance current Io and is clamped at an absolute value level corresponding to the secondary side direct-current output voltage Eo.

Incidentally, while the voltage V2 is shown as a potential obtained at the winding part N2C2, a potential having a similar waveform occurs at the winding part N2B2 in the secondary winding N2B and the winding part N2A2 in the secondary winding N2A. Also, in this case, a potential similar to the voltage V2 occurs at the winding part N2A1, the winding part N2B1, and the winding part N2C1.

The voltage V2 has a waveform that becomes a zero level in timing in which the primary side series resonance current Io becomes a zero level. That is, zero cross timing of the voltage V2 in this case coincides with zero cross timing of the primary side series resonance current Io (see times t1, t2, and t3 in the figure).

In the secondary side synchronous rectifier circuit employing a voltage detection system, the driving circuit comprising the resistance Rg2 detects the voltage V2 (the voltage occurring in the winding parts N2A2, N2B2, and N2C2), and then outputs a gate voltage at an on level to the MOS-FET Q4.

In this case, the voltage V2 has a waveform that reaches a peak level of positive polarity at time t1, thereafter lowers its level, and then becomes a zero level at time t2, as shown in the figure. A gate-to-source voltage VGS4 generated between the gate and the source of the MOS-FET Q4 provides an on voltage during a period (a period from t1 to td1 in the figure) during which the voltage V2 is maintained at not less than a level corresponding to a predetermined level set for the gate-to-source voltage of the MOS-FET Q4. That is, the period from t1 to td1 is an on period DON2 of the MOS-FET Q4.

A period from time td1 at which the period DON2 ends to time t2 is a dead time of the MOS-FET Q4. During the period of the dead time from time td1 to time t2, a rectified current flows via the body diode DD4 of the MOS-FET Q4. This is also indicated by a potential of the gate-to-source voltage VGS4 shown in the figure during the period from time td1 to time t2.

Thereby the rectified current I4 flows via the MOS-FET Q4 over a period from time t1 to time t2 as shown in the figure. That is, zero level timing of the rectified current I4 coincides with zero level timing of the primary side series resonance current Io at times t1 and t2, and thereby the rectified current I4 is continuous with the primary side series resonance current.

Similarly, the driving circuit comprising the resistance Rg1 detects a voltage occurring in the winding parts N2A1, N2B1, and N2C1 which voltage is similar to the voltage V2, and then outputs a gate voltage at an on level to the MOS-FET Q3.

That is, in this case, a gate-to-source voltage VGS3 generated between the gate and the source of the MOS-FET Q3 provides an on voltage during a period (a period from t2 to td2 in the figure) during which the voltage V2 occurring on the sides of the winding parts N2A1, N2B1, and N2C1 is maintained at not less than a level corresponding to a predetermined level of the gate-to-source potential. Thus, the period from t2 to td2 is an on period DON1 of the MOS-FET Q3.

A period from time td2 at which the period DON1 ends to time t3 is similarly a dead time of the MOS-FET Q3. During the period from time td2 to time t3, a rectified current flows via the body diode DD3 of the MOS-FET Q3.

Thereby the rectified current I3 flows via the MOS-FET Q3 over a period from time t2 to time t3 which times are zero cross timing of the primary side series resonance current Io, as shown in the figure. Thus the rectified current I3 flows continuously with the primary side series resonance current Io.

A charging current Ic for charging the smoothing capacitor flows with a waveform as shown in the figure which waveform is a synthesis of the rectified currents I3 and I4. Thus, double-wave rectification operation, in which the smoothing capacitor Co is charged during each of the periods when the voltage occurring at the secondary windings N2A, N2B, and N2C is positive and negative, is obtained as rectification operation.

As described above, the rectified current I3 and the rectified current I4 flow continuously with the primary side series resonance current Io. Therefore the charging current Ic for charging the smoothing capacitor Co also flows continuously.

It can thus be understood that even when the switching frequency is controlled to be decreased at heavy load, the circuit of FIG. 6 obtains a continuous mode of the secondary side rectified current.

Figure 7B:
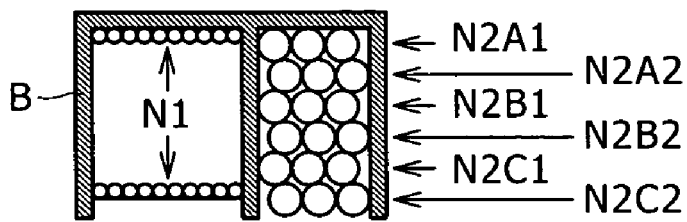

The continuous mode is obtained also in this case under the condition of the heavy load because the coupling coefficient of the isolated converter transformer PIT is lowered to about 0.8 by the setting of the gap length to provide a looser coupling state as described with reference to FIG. 7 and the winding numbers (numbers of turns) of the primary winding N1 and the secondary windings N2A, N2B, and N2C are set such that the voltage level induced per turn of the secondary winding is decreased to about 2 V/T, for example, whereby magnetic flux density at the core of the isolated converter transformer PIT is decreased to a required value or lower.

Also, FIG. 8 shows that a current in an opposite direction does not flow as the rectified currents I3 and I4 in this case.

Specifically, in the conventional example, an opposite-direction current of about 8 Ap flows as rectified current, causing a power loss. In addition, as is understood from the result of FIG. 4 described above, the circuit of FIG. 1 reduces such an opposite-direction current as compared with the conventional example but does not completely prevent the opposite-direction current. On the other hand, such an opposite-direction current does not occur as rectified current in the circuit of FIG. 6.

In this case, the current in the opposite direction does not occur in the rectified currents I3 and I4 because the inductors Ld1 and Ld2 are inserted in respective rectified current paths as shown in FIG. 6.

Specifically, an inductor thus inserted in a rectified current path generates a counter electromotive force when a rectified current flows. With the counter electromotive force thus generated, the opposite-direction current occurring at the time of turning off the MOS-FETs Q3 and Q4 is suppressed.

As described earlier, these inductors Ld1 and Ld2 in the circuit of FIG. 6 have a relatively low inductance of 1.0 μH or lower set thereto. It is thereby possible to prevent occurrence of the opposite-direction current in the rectified currents I3 and I4.

Incidentally, in FIG. 8, a negative potential occurs as the gate-to-source voltages VGS3 and VGS4 in timing of turning off the MOS-FETs Q3 and Q4, respectively. This is because the Schottky diodes Dg1 and Dg2 are respectively inserted in parallel with the gate resistances Rg1 and Rg2 between the secondary winding and the gates of the MOS-FETs Q3 and Q4, as described earlier.

The Schottky diodes Dg1 and Dg2 thus inserted allow an accumulated charge of a gate input capacitance (Ciss) of the MOS-FETs Q3 and Q4 to be discharged in such a manner as to be extracted via these Schottky diodes Dg1 and Dg2 at the time of turning off the MOS-FETs Q3 and Q4.

Specifically, in this case, the charge of the gate input capacitance is discharged through a path from the Schottky diode Dg (Dg1 and Dg2) through the secondary winding N2 to the smoothing capacitor Co. By thus discharging the charge of the input capacitance, it is possible to reduce a voltage drop time at the time of turning off the MOS-FETs Q3 and Q4.

When the voltage drop time at the time of turning off the MOS-FETs Q3 and Q4 can be thus reduced, these MOS-FETs Q3 and Q4 are securely turned off to provide better switching characteristics.

FIG. 9 shows operation of the circuit shown in FIG. 6 at light load (Po=25 W). Also in this case, in a condition where switching frequency is controlled to be high so as to correspond to the light load, the secondary side winding voltage V2 is obtained in substantially the same timing as the voltage V1 across the switching device Q2 shown in the figure. Accordingly, the secondary side charging current Ic (the rectified currents 13 and 14) flows so as to continuously charge the smoothing capacitor Co without a period of discontinuity as shown in the figure. It can thus be understood that the supply circuit of FIG. 6 is also in a continuous mode at the time of the light load.

The switching power supply circuit shown in FIG. 6 can be set in the continuous mode even at the time of heavy load by providing a loose coupling state to the isolated converter transformer PIT and decreasing the voltage level induced per turn of the secondary winding to thereby decrease the secondary magnetic flux density to a required value or lower.

It is thereby possible to reduce the opposite-direction current occurring in the discontinuous mode as in the conventional example, and thereby reduce ineffective power. Further, as described above, the circuit of FIG. 6 has the inductors Ld1 and Ld2 inserted in the respective rectified current paths to prevent an opposite-direction current from occurring in the rectified currents. That is, ineffective power is further reduced by such inductors Ld1 and Ld2. Such a reduction of ineffective power improves AC-to-DC power conversion efficiency.

Incidentally, according to an obtained result of an experiment, as the AC-to-DC power conversion efficiency ($\eta AC \rightarrow DC$) of the power supply circuit of FIG. 6, $\eta AC \rightarrow DC$=about 88% when the alternating input voltage $\eta AC$=100 V and the load power Po=150 W.

This represents an improvement of about six percentage points over $\eta AC \rightarrow DC$=about 82% (when the alternating input voltage VAC=100 V and the load power Po=100 W) of the circuit shown in FIG. 24 as a conventional example.

Figure 29:
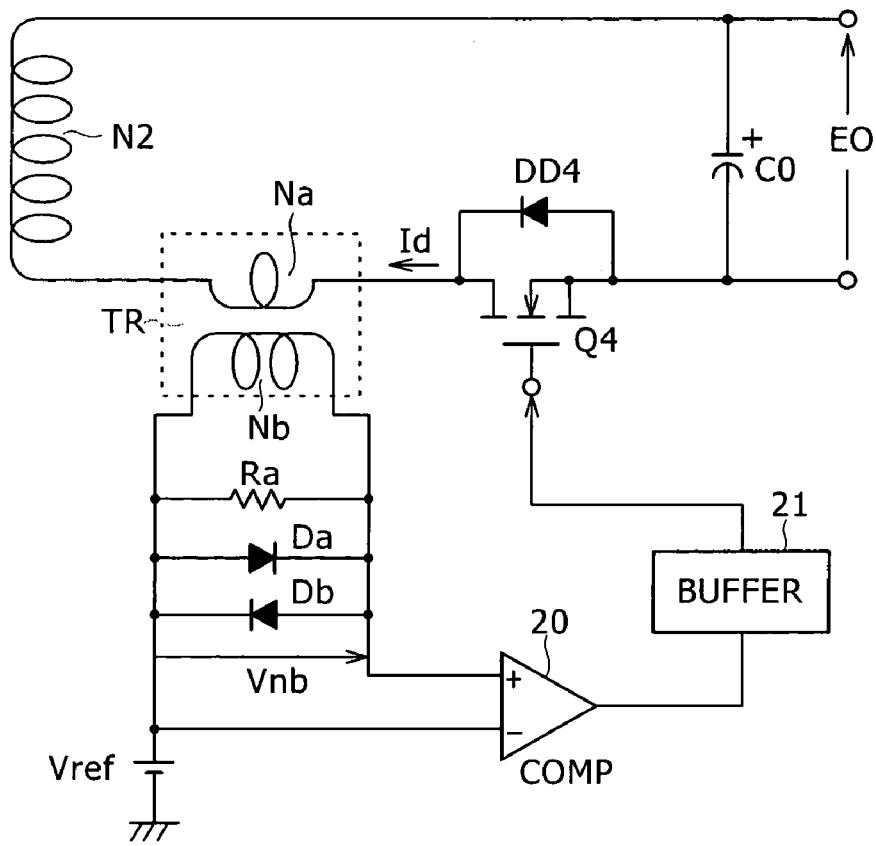
FIG. 29 is a circuit diagram showing an example of basic configuration of a synchronous rectifier circuit using a rectified current detection system.
Figure 30:
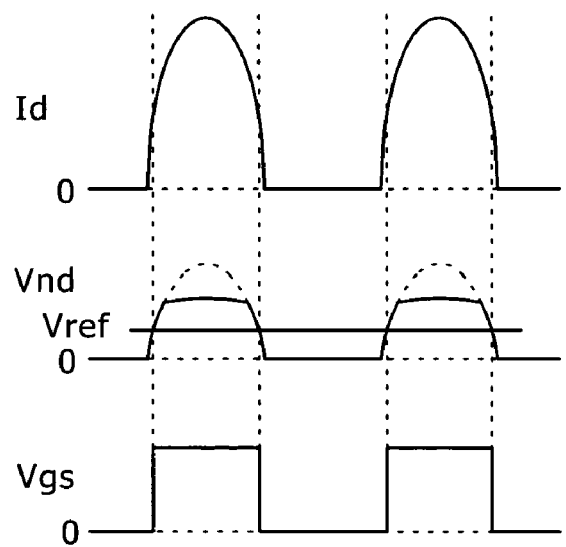
FIG. 30 is a waveform chart showing operation of the synchronous rectifier circuit shown in FIG. 29.

The characteristic of the power conversion efficiency of the circuit of FIG. 6 is equal to that of a case where a synchronous rectifier circuit using a rectified current detection system is employed on the secondary side (see FIG. 29) in combination with the primary side configuration shown in FIG. 24. Specifically, while the AC-to-DC power conversion efficiency when the rectified current detection system of FIG. 29 is employed is $\eta AC \rightarrow DC$=about 90% as described above, $\eta AC \rightarrow DC$=88% in this example, which is roughly the same as the AC-to-DC power conversion efficiency when the rectified current detection system of FIG. 29 is employed.

However, the power supply circuit shown in FIG. 6 employs the winding voltage detection system for the configuration of the synchronous rectifier circuit, and therefore the circuit configuration of the power supply circuit shown in FIG. 6 can be made simpler.

Figure 10:
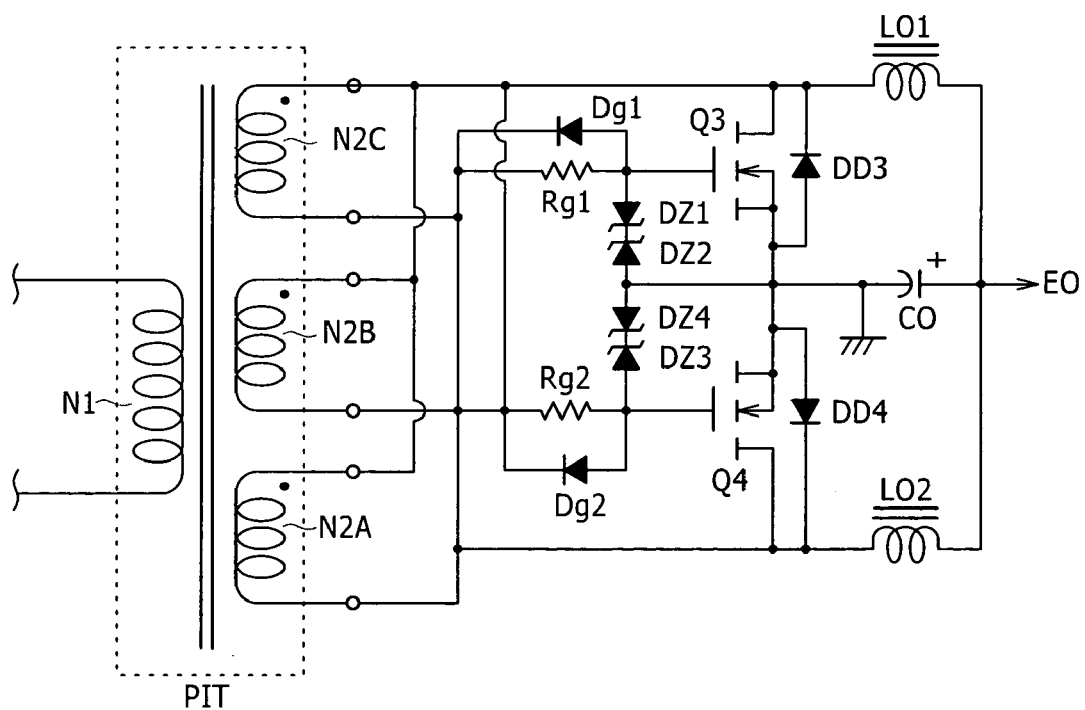
FIG. 10 is a circuit diagram illustrating another configuration of a power supply circuit that can be formed on the basis of the power supply circuit shown in FIG. 1.

Next, FIG. 10 shows another example of a configuration to meet a condition of a heavier load on the basis of the configuration of the circuit shown in FIG. 1.

Incidentally, FIG. 10 shows only a configuration on a secondary side. A configuration on a primary side is equal to that of FIG. 6, and therefore description thereof will be omitted. Also, in FIG. 10, parts already described with reference to FIG. 6 are identified by the same reference numerals, and description thereof will be omitted.

Also in the circuit shown in FIG. 10, three windings, that is, secondary windings N2A, N2B, and N2C are wound as a secondary winding of an isolated converter transformer PIT. In this case, however, no center tap is provided to the secondary windings N2, and the inductors Ld1 and Ld2 provided so as to be inserted in the respective rectified current paths in the circuit of FIG. 6 are omitted.

In the case of the circuit shown in FIG. 10, an end part at a winding end of each of the secondary windings N2A, N2B, and N2C is connected to a drain of a MOS-FET Q3. The drain of the MOS-FET Q3 is connected to a positive electrode terminal of a smoothing capacitor Co via an inductor Lo1 shown in the figure.

An end part at a winding start of each of the secondary windings N2A, N2B, and N2C in this case is connected to a drain of a MOS-FET Q4. The drain of the MOS-FET Q4 is connected to the positive electrode terminal of the smoothing capacitor Co via an inductor Lo2.

A negative electrode terminal of the smoothing capacitor Co is connected to a junction between respective sources of the MOS-FET Q3 and the MOS-FET Q4. Further, a secondary side ground is connected to a junction between the junction between the sources and the negative electrode terminal of the smoothing capacitor Co.

Also in this case, in such a form of connection, the MOS-FET Q3 and the MOS-FET Q4 are inserted between one end part of each of the secondary windings N2A, N2B, and N2C and the negative electrode terminal of the smoothing capacitor Co, and between the other end part of each of the secondary windings N2A, N2B, and N2C and the negative electrode terminal of the smoothing capacitor Co.

According to the configuration of the secondary side synchronous rectifier circuit described above, in response to turning on of the MOS-FET Q3 in one half of a cycle of an alternating voltage induced on the secondary side, a rectified current flows through a path from each secondary winding N2 (N2A, N2B, and N2C) through the inductor Lo2, the smoothing capacitor Co, and the MOS-FET Q3 to each secondary winding N2. In this case, the rectified current branches to also flow through a loop path from the MOS-FET Q3 through the inductor Lo1 to the smoothing capacitor Co.

In the other half of the cycle in which the MOS-FET Q3 is off and the MOS-FET Q4 is on, a rectified current flows through a path from each secondary winding N2 (N2A, N2B, and N2C) through the inductor Lo1, the smoothing capacitor Co, and the MOS-FET Q4 to each secondary winding N2. Also in this case, the rectified current branches to also flow through a loop path from the MOS-FET Q4 through the inductor Lo2 to the smoothing capacitor Co.

Thus, the secondary side rectifier circuit of the circuit shown in FIG. 10 obtains an operation in which the MOS-FET Q3 is driven on to perform rectification and charge the smoothing capacitor Co during a period when the alternating voltage of the secondary windings N2A, N2B, and N2C is of one polarity and the MOS-FET Q4 is driven on to perform rectification and charge the smoothing capacitor Co during a period when the alternating voltage of the secondary windings N2A, N2B, and N2C is of the other polarity. That is, also in this case, double-wave rectification operation of the synchronous rectifier circuit is obtained.

As is understood from the above-described rectified current paths, the rectified current on the secondary side branches and flows through the loop path including the inductor Lo1 and the loop path including the inductor Lo2 during the period of positive polarity/negative polarity of the alternating voltage induced in the secondary windings N2A, N2B, and N2C. Further, the rectified current branches and flows to the secondary windings N2A, N2B, and N2C in the other paths. Thus, an amount of rectified current (secondary winding current) flowing to the secondary windings N2A, N2B, and N2C is reduced to a predetermined proportion with respect to an amount of rectified current flowing to the smoothing capacitor Co as charging current. That is, an operation of a so-called current doubler rectifier circuit is obtained by the secondary side configuration shown in FIG. 10.

As described above, the circuit shown in FIG. 10 has the inductor Lo1 and the inductor Lo2 inserted in the secondary side rectified current paths.

As with the above inductors Ld inserted in the case of FIG. 6, these inductors Lo1 and Lo2 provided in the circuit of FIG. 10 have a relatively low inductance of 1.0 µH or lower set thereto. Also in this case, such inductors Lo1 and Lo2 produce an effect of suppressing an opposite-direction current of the rectified current which effect is equal to that of the inductors Ld1 and Ld2 in the circuit of FIG. 6.

Further, in this case, these inductors Lo1 and Lo2 are connected to the positive electrode terminal of the smoothing capacitor Co. It is therefore possible to suppress a high-frequency component (a ripple) occurring in a secondary side direct-current output voltage Eo. That is, an impedance component (an alternating-current resistance) of the inductors Lo1 and Lo2 can reduce the high-frequency component superimposed on the secondary side direct-current output voltage Eo.

The circuit of FIG. 10 can be set in the continuous mode even at the time of heavy load by providing a looser coupling state to the isolated converter transformer PIT and decreasing a voltage level induced per turn of the secondary winding to thereby decrease the magnetic flux density to a required value or lower.

Also in this case, by inserting the inductors Lo1 and Lo2 in the rectified current paths as described above, it is possible to prevent the opposite-direction current of the rectified current, and thereby further reduce ineffective power.

The power supply circuits of FIG. 6 and FIG. 10 described so far have a plurality of secondary windings N2 connected in parallel with each other and wound on the secondary side of the isolated converter transformer PIT.

Such a plurality of secondary windings connected in parallel with each other and wound have an advantage of being able to reduce ineffective power of the secondary winding N2 as compared with a case where only one secondary winding N2 is wound as in the circuit shown in FIG. 1. That is, in comparison between the circuit of FIG. 1 and the circuit of FIG. 6, when the secondary winding N2 as a whole has an equal number of turns, a direct-current resistance value of each secondary winding N2 can be lowered in a case where a plurality of secondary windings N2 are wound in parallel with each other as compared with a case where one secondary winding N2 is wound, and correspondingly ineffective power of the secondary winding N2 as a whole can be reduced.

In order to reduce the ineffective power of such secondary windings N2, the power supply circuit shown in FIG. 6, for example, has the plurality of secondary windings N2 wound by rough winding by the same number of turns (3 T) each around the same axis of the winding part of the bobbin B of the isolated converter transformer PIT in order of the winding parts N2A1, N2A2, N2B1, N2B2, N2C1, and N2C2 as shown in FIG. 7B.

Though not described with reference to a figure, the secondary windings of the circuit shown in FIG. 10 are wound by rough winding by the same number of turns (6 T in this case) each around the same axis of the winding part of the bobbin B in order of the secondary windings N2A, N2B, and N2C.

However, when each winding part of the secondary windings N2 is thus wound by the same number of turns around the same axis of the winding part of the bobbin B, a winding part wound on an outer side has a longer length than a winding part wound on an inner side.

Specifically, in the secondary windings as a whole in the case of the circuit of FIG. 6, for example, the winding part N2A1 including the end part at the winding start of the secondary winding N2A has the shortest length, and lengths of the succeeding winding parts N2A2, N2B1, N2B2, N2C1, and N2C2 are required to be increased in that order.

Thus, since a winding part wound on an outer side needs to have a longer length, the winding wound on the outer side in the secondary winding has a higher value of direct-current resistance.

According to an experiment, as to the direct-current resistance values of the winding parts in the circuit of FIG. 6, the winding part N2A1=4.8 mΩ, the winding part N2A2=5.3 mΩ, the winding part N2B1=5.8 mΩ, the winding part N2B2=6.3 mΩ, the winding part N2C1=6.8 mΩ, and the winding part N2C2=7.3 mΩ.

Let Ro1 be a value of combined direct-current resistance of a group of the winding parts N2A1, N2B1, and N2C1 in parallel with each other in the secondary winding N2, and let Ro2 be a value of combined direct-current resistance of a group of the winding parts N2A2, N2B2, and N2C2 similarly in parallel with each other.

The value of combined direct-current resistance Ro1 is about 1.9 mΩ from 1/Ro1=1/4.8+1/5.8+1/6.8.

The value of combined direct-current resistance Ro2 is about 2.1 mΩ from 1/Ro2=1/5.3+1/6.3+1/7.3.

Such direct-current resistances cause a corresponding power loss in the secondary winding of the isolated converter transformer PIT.

For example, when a rectified current of 30 A flows through the secondary winding under the condition of low voltage and high current in the circuit of FIG. 6, the power loss in the secondary winding in this case is about 1.8 W from $$30^2 \times (1.9+2.1) \times 10^{-3}/2$$

In addition, in the switching power supply circuits having the configurations shown in FIG. 6 and FIG. 10, a rectified current of a relatively high frequency corresponding to the switching output on the primary side flows through the secondary winding of the isolated converter transformer PIT.

It is known that the high-frequency current flowing through the secondary winding causes an eddy-current loss in the litz wire used as a wire material for the secondary winding. Further, with such an eddy-current loss, heat generation of each winding part is increased.

One known method for suppressing such an eddy-current loss is to reduce the wire diameter of each of the elemental wires forming the litz wire. That is, the wire diameter of each of the elemental wires of the litz wire is reduced, and the number of elemental wires is correspondingly increased.

However, the use of a large number of thin elemental wires for a litz wire has the following problem.

Generally, in actual winding of each winding part of the secondary winding around the isolated converter transformer PIT, a coating of each of the elemental wires inside the litz wire as the winding part is peeled, for example, to expose internal copper wires, and a bundle of these copper wires is for example wound around a corresponding pin terminal of the isolated converter transformer PIT and then soldered to the pin terminal. Each winding part in the circuits of FIG. 6 and FIG. 10 is attached to the isolated converter transformer PIT by such a method.

In the case where the elemental wires are thus bundled and wound around the pin terminal, when the elemental wires are reduced in diameter and increased in number as described above, it becomes correspondingly difficult to wind the litz wire around the pin terminal.

For example, as described above, the circuits of FIG. 6 and FIG. 10 use a litz wire formed by a bundle of 100 elemental wires $10a$ having a wire diameter X=0.1 mφ partly in consideration of the above problem in manufacturing the isolated converter transformer PIT. That is, in manufacturing the isolated converter transformer PIT in this case, 100 elemental wires $10a$ having a wire diameter X=0.1 mφ as described above is a limit when work efficiency and economy are considered. It has been considered to be practically close to impossible to use a litz wire formed by elemental wires having a smaller wire diameter than the wire diameter X=0.1 mφ.

For this reason, it has been extremely difficult to reduce an eddy-current loss by reducing the wire diameter of the elemental wires $10a$ in the circuits of FIG. 6 and FIG. 10.

Accordingly, as a second embodiment of the present invention, a secondary winding (each winding part) of an isolated converter transformer PIT is formed as described in the following with a circuit in a form of connection as shown in FIG. 6 and FIG. 10 used as a basic configuration.

Incidentally, FIGS. 11 to 14 for the description below show the formation of the secondary winding of the isolated converter transformer PIT on the basis of a configuration having center taps provided for the secondary winding as shown in FIG. 6.

First, the first embodiment also uses a litz wire as shown in FIG. 11 as a wire material for the secondary winding of the isolated converter transformer PIT.

A litz wire formed by twisting together 250 elemental wires $10a$ having a wire diameter X=0.06 mφ is used as the litz wire 10 in this case. The litz wire 10 used by the present embodiment has for example a wire diameter d 0.95 mφ and a cross-sectional area s=0.7065 mm².

Figure 12:
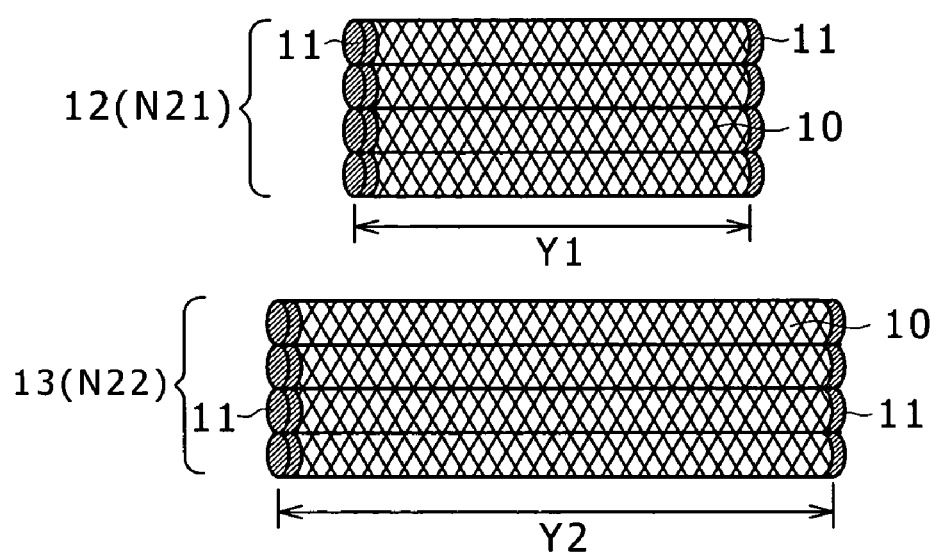
FIG. 12 is a diagram of assistance in explaining an example of structure of the secondary winding of the isolated converter transformer provided in the power supply circuit according to the second embodiment.

Then, as shown in FIG. 12, two sets of four such litz wires 10 are prepared. The four litz wires 10 of one set have a uniform length Y1 as shown in the figure. The four litz wires 10 of the other set have a uniform length Y2 longer than the length Y1. For example, Y1=20 cm and Y2=22 cm are set as the lengths Y1 and Y2 in this case so as to correspond to size of the bobbin.

With the four litz wires 10 having the uniform length Y1 arranged in parallel with each other and aligned with each other as shown in the figure, preliminary soldering 11 is performed to both ends of the aligned litz wires 10. Thereby a first litz wire band 12 of the four litz wires 10 having the length Y1 is formed.

Also, with the four litz wires 10 having the other uniform length Y2 similarly aligned in parallel with each other, preliminary soldering 11 is performed to both ends of the aligned litz wires 10. Thereby a second litz wire band 13 of the four litz wires 10 having the length Y2 is formed.

Incidentally, it suffices to perform the preliminary soldering 11 in this case by dipping each end part of the litz wire band in a soldering dip layer for a required time, for example.

The thus formed first litz wire band 12 of the length Y1 is used as a wire material for a secondary winding N21 corresponding to the winding parts (the winding parts N2A1, N2B1, and N2C1) from the end parts at the winding starts to the center taps in the secondary winding of the isolated converter transformer shown in FIG. 6.

The second litz wire band 13 of the other length Y2 is used as a wire material for a secondary winding N22 corresponding to the winding parts (the winding parts N2A2, N2B2, and N2C2) from the end parts at the winding ends to the center taps in the secondary winding of the isolated converter transformer PIT shown in FIG. 6.

Incidentally, the four litz wires 10 are aligned with each other as the first litz wire band 12 (the secondary winding N21) and the second litz wire band 13 (the secondary winding N22) for a purpose of attaining an equal total cross-sectional area (conductor part) of the secondary winding as a whole in obtaining equal operation to that of the circuit shown in FIG. 6, for example.

That is, as is understood from the description so far, the litz wires 10 in this case has a smaller cross-sectional area s than in the case of FIG. 6, and thus the number of litz wires 10 being used is correspondingly increased.

After the first litz wire band 12 as the secondary winding N21 and the second litz wire band 13 as the secondary winding N22 are formed as shown in FIG. 12, in the second embodiment, the first litz wire band 12 and the second litz wire band 13 are wound around the isolated converter transformer PIT as described in the following.

Figure 13:
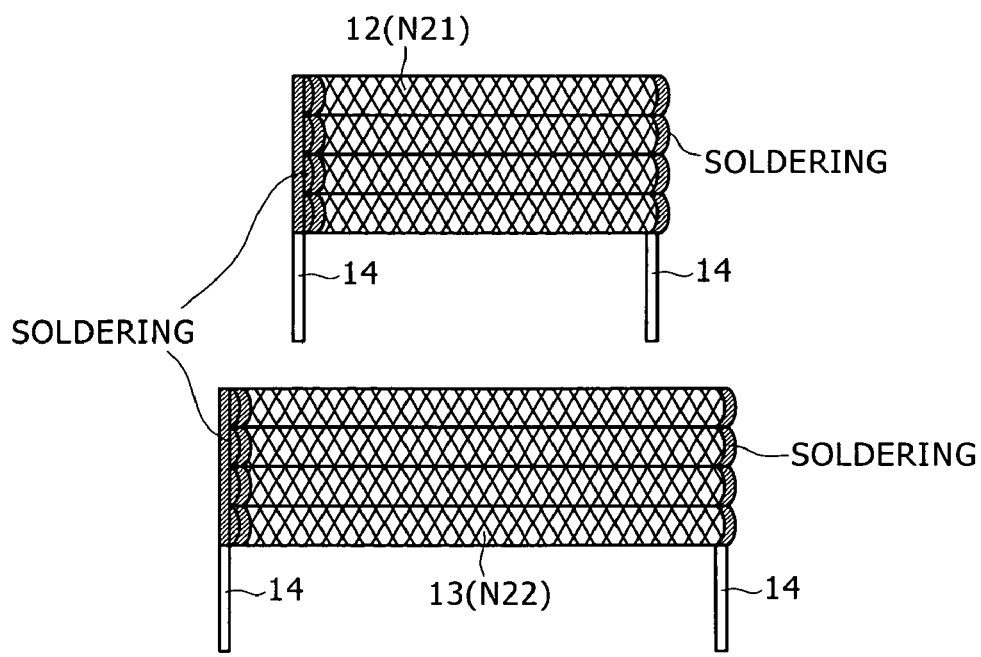
FIG. 13 is a diagram of assistance in explaining an example of structure of the secondary winding of the isolated converter transformer provided in the power supply circuit according to the first embodiment.

First, as shown in FIG. 13, a lead wire 14 is soldered to each of the end parts of the first litz wire band 12 and the second litz wire band 13 to which end parts the preliminary soldering 11 has been performed.

Of the first litz wire band 12 and the second litz wire band 13 having the lead wire 14 soldered to each end part thereof, the first litz wire band 12 is first wound around the secondary side winding part of the bobbin B in the isolated converter transformer PIT by a predetermined number of turns. Then, the second litz wire band 13 is wound on the outside of the thus wound first litz wire band 12 by a predetermined number of turns.

Figure 14:
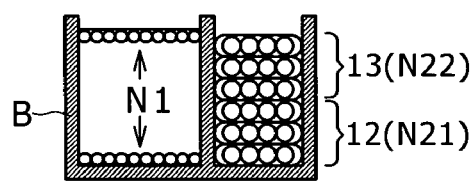
FIG. 14 is a diagram of assistance in explaining a wound state of the secondary winding of the isolated converter transformer provided in the power supply circuit according to the first embodiment.
Figure 14:
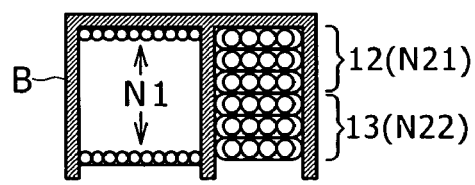

FIG. 14 is a sectional view showing a state of the windings being wound in the isolated converter transformer PIT in the second embodiment.

In this case, the first litz wire band 12 is wound in the winding part of the bobbin B as shown in the figure with the alignment of the four litz wires 10 maintained. Similarly, the second litz wire band 13 is wound in the winding part of the bobbin B as shown in the figure with the alignment of the four litz wires 10 maintained.

In this case, three turns is provided for the first litz wire band 12 (the secondary winding N21) as shown in the figure. Similarly, three turns is provided for the second litz wire band 13 (the secondary winding N22) as shown in the figure.

Incidentally, though not described with reference to a figure, in this case, the lead wires 14 and 14 soldered to both end parts of the first litz wire band 12 as shown in FIG. 13, the first litz wire band 12 being wound around the bobbin B as described above, are wound around a predetermined pin terminal of the isolated converter transformer PIT, and then soldered. Also, the lead wires 14 and 14 similarly soldered to both end parts of the second litz wire band 13 are wound around a predetermined pin terminal, and then soldered.

According to the second embodiment, a state equal to that of each winding part shown in FIG. 6, for example, being wound in a state of being arranged in parallel is obtained. Specifically, by winding the first litz wire band 12, a state equal to that of the winding parts N2A1, N2B1, and N2C1 being arranged in parallel with each other is obtained. Further, by winding the second litz wire band 13, a state equal to that of the winding parts N2A2, N2B2, and N2C2 being arranged in parallel with each other is obtained.

Thus, the second embodiment having the first litz wire band 12 and the second litz wire band 13 wound as the secondary winding can prevent a difference in the value of direct-current resistance between the winding parts in a parallel relation to each other as described above.

When the difference in the value of direct-current resistance between the winding parts can be thus eliminated to make the direct-current resistances occurring in the respective litz wires 10 an equal value, the value of combined direct-current resistance of each winding (the secondary winding N21 and the secondary winding N22) can be reduced as compared with the case of FIG. 6 (the secondary winding N2A and the secondary winding N2B).

Further, in this case, since the plurality of litz wires 10 as the secondary winding in this example are wound around the bobbin B in an aligned state as shown in FIG. 14, a space between the wound litz wires 10 can be reduced as compared with the case of rough winding of the litz wires 10 (windings) as in the circuit of FIG. 6 (see FIG. 7B). That is, in this case, since the windings can be wound with a reduced space between the windings as compared with the circuit of FIG. 6, length of the wound litz wires 10 can be shortened.

The shortened length of the litz wires 10 (windings) also reduces the value of combined direct-current resistance as compared with the circuit of FIG. 6.

According to an obtained result of an experiment, as the value of direct-current resistance of the secondary winding in the second embodiment, the value of combined direct-current resistance of the secondary winding N21 formed by the first litz wire band 12 is Ro21=1.3 mΩ, and the value of combined direct-current resistance of the secondary winding N22 formed by the second litz wire band 13 is Ro22=1.4 mΩ. That is, the obtained result indicates that the values of combined direct-current resistance Ro21 and Ro22 are reduced as compared with the values of combined direct-current resistance Ro1=1.9 mΩ and Ro2=2.1 mΩ in the case of the circuit of FIG. 6.

As a result of the reduction of the values of direct-current resistance of the secondary winding, when a rectified current of 30 A flows as in the circuit of FIG. 6, a power loss occurring in the secondary winding of the switching power supply circuit of the second embodiment is 1.2 W from $$30^2 \times (1.3+1.4) \times 10^{-3}/2$$

This represents a substantial reduction from the power loss of 1.8 W in the case of the circuit of FIG. 6.

As described above, in the second embodiment, preliminary soldering 11 is performed to both ends of the first litz wire band 12 and the second litz wire band 13, and lead wires 14 are soldered to both ends of the first litz wire band 12 and the second litz wire band 13. Then, each of the thus soldered lead wires 14 is wound around a pin terminal of the isolated converter transformer PIT and then soldered to the pin terminal.

Thus, the process of bundling a plurality of elemental wires 10a within a litz wire 10 and winding the bundled elemental wires 10a around a pin terminal as in the circuits of FIG. 6 and FIG. 10 can be obviated.

When the process of bundling elemental wires 10a and winding the bundled elemental wires 10a around a pin terminal is thus obviated, the number of elemental wires 10a and the wire diameter X of the elemental wires 10a as a litz wire 10 do not need to be limited.

Thus, in the second embodiment, as described above, litz wires 10 having an elemental wire diameter of 0.06 mφ, which is smaller than the elemental wire diameter=0.1 mφ in the case of the circuits of FIG. 6 and FIG. 10, can be selected as the litz wires 10.

By thus reducing the wire diameter of the elemental wires 10a of the litz wires 10, it is possible to reduce an eddy-current loss caused by the flow of a high-frequency rectified current, and also suppress heat generation of the secondary winding due to the eddy-current loss.

Thus, in the power supply circuit according to the second embodiment, the power loss (copper loss) in the secondary winding of the isolated converter transformer PIT is reduced by winding the secondary winding in an aligned state, and further the eddy-current loss is reduced by decreasing the wire diameter of the elemental wires 10a of the litz wires 10, whereby power conversion efficiency can be improved as compared with the circuit of FIG. 6.

For example, as shown earlier, the AC-to-DC power conversion efficiency of the circuit of FIG. 6 is ηAC→DC=about 88% under the condition of the alternating input voltage VAC=100 V and the load power Po=150 W. On the other hand, an experimental result obtained shows that the AC-to-DC power conversion efficiency (ηAC→DC) of the power supply circuit according to the present embodiment is ηAC→DC=about 89.6% under the same condition, which represents an improvement of about 1.6 percentage points over the circuit of FIG. 6.

Also, an obtained result indicates that alternating-current input power in this case is reduced by 3.0 W as compared with the circuit of FIG. 6.

Further, in this case, since the litz wires 10 are wound in an aligned state, the secondary winding wound in the isolated converter transformer PIT can be wound by two sets of windings, whereas in the case of FIG. 6, the secondary winding wound in the isolated converter transformer PIT is wound by three divided sets of windings.

Figure 15:
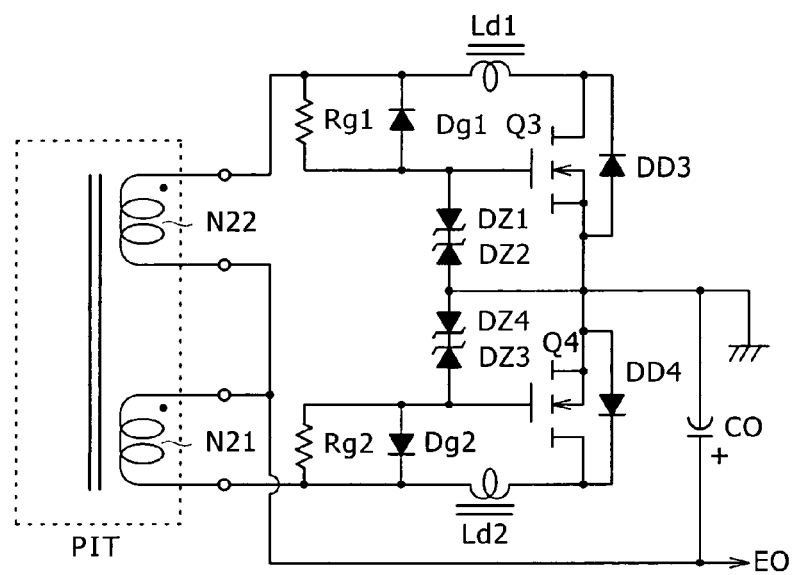
FIG. 15 is a circuit diagram showing a configuration on a secondary side on the basis of the configuration of FIG. 6, as a configuration of the switching power supply circuits according to the second, third, and fourth embodiments of the present invention.

A configuration on the secondary side of the switching power supply circuit according to the second embodiment described above is shown in a circuit diagram of FIG. 15. As shown in FIG. 15, according to the second embodiment, the three divided winding parts N2A1, N2B1, and N2C1 wound in the case of FIG. 6 can be formed by winding one winding as the secondary winding N21. Similarly, the three winding parts N2A2, N2B2, and N2C2 wound dividedly can be formed by winding one winding as the secondary winding N22.

Since the number of secondary windings of the isolated converter transformer PIT can be reduced to two, the number of pin terminals of the isolated converter transformer PIT in this case can be reduced to four from nine in the case of FIG. 6.

Since the number of pin terminals can be decreased, an area for mounting the isolated converter transformer PIT on a board can be reduced.

A decrease in the number of secondary windings as described above also reduces the number of parts where a wire material is wound for connection of each winding, thus bringing another advantage of the manufacturing of the isolated converter transformer PIT becoming correspondingly easier.

It is to be noted that while a configuration based mainly on the power supply circuit shown in FIG. 6 has been described above as the switching power supply circuit according to the second embodiment, similar effects can be obtained when the circuit of FIG. 10 is used as a basic configuration, by forming the secondary winding in a similar manner to that described with reference to FIGS. 12 to 14.

Specifically, in this case, one litz wire band as shown in FIG. 12 is formed as one winding in which the secondary windings N2A, N2B, and N2C shown in FIG. 10 are aligned with each other. Then, in this case, this litz wire band is wound by 6 T turns around the bobbin B of the isolated converter transformer PIT.

Figure 16:
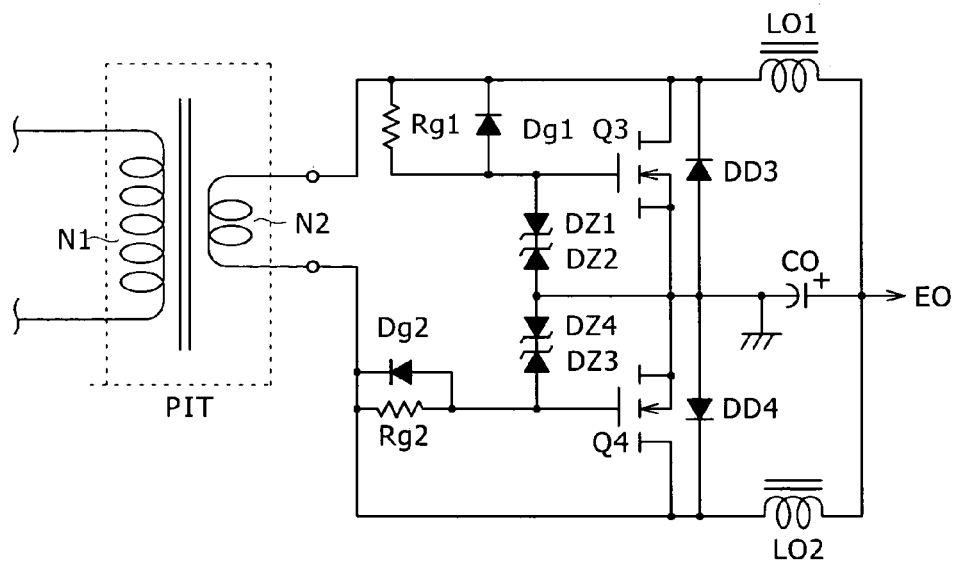
FIG. 16 is a circuit diagram showing a configuration on a secondary side on the basis of the configuration of FIG. 10, as a configuration of the switching power supply circuits according to the second, third, and fourth embodiments of the present invention.

Thus, in the switching power supply circuit according to the second embodiment based on the circuit shown in FIG. 10, the secondary winding N2 of the isolated converter transformer PIT is formed by only one winding, as shown in a circuit diagram of FIG. 16.

Also in this case, the value of direct-current resistance can be made equal between the winding parts in a parallel relation to each other. Accordingly, the value of combined direct-current resistance of the secondary winding N2 as a whole can be reduced as compared with the case of FIG. 10.

Also in this case, when the litz wire band as the secondary winding N2 is preliminarily soldered and a lead wire 14 leading to a pin terminal of the isolated converter transformer PIT is soldered to the litz wire band, litz wires 10 having a smaller elemental wire diameter X can be used to reduce an eddy-current loss.

Further, since the number of secondary windings N2 in this case can be reduced to one, the number of pin terminals of the isolated converter transformer PIT in this case can be reduced to two, as shown in the circuit diagram of FIG. 16. Therefore an area for mounting the isolated converter transformer PIT on a board can be reduced as compared with the circuit of FIG. 10.

A third embodiment of the present invention will next be described with reference to FIGS. 17 to 19.

Also in the third embodiment, only the structure of a secondary winding in an isolated converter transformer PIT is changed on the basis of the configuration of the power supply circuits shown in FIG. 6 and FIG. 10. Also in this case, FIGS. 17 to 19 show the structure of the secondary winding of the isolated converter transformer PIT based on the configuration in which a center tap is provided to the secondary windings shown in FIG. 6.

First, also in the third embodiment, a litz wire 10 as shown in FIG. 11 is used as a wire material for the secondary winding. A litz wire including a bundle of 200 elemental wires with an elemental wire diameter $X=0.10$ m$\phi$ and having a cross-sectional area $s=1.570$ mm$^2$ is selected as the litz wire 10 used in the third embodiment.

In this case, a flat woven wire formed by interweaving three such litz wires 10 is prepared.

Figure 17:
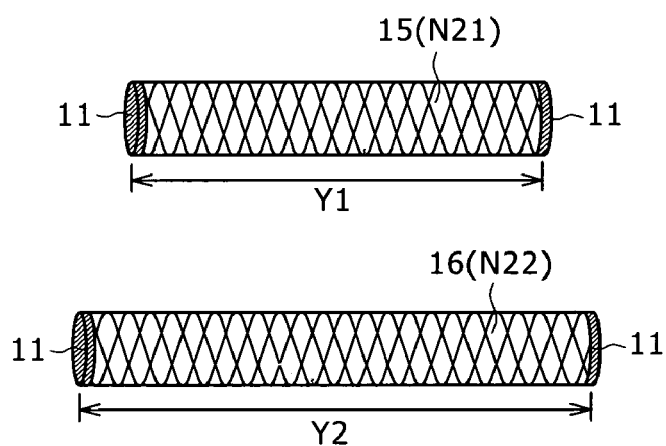
FIG. 17 is a diagram of assistance in explaining an example of structure of the secondary winding of the isolated converter transformer provided in the power supply circuit according to the third embodiment.

In the third embodiment, as shown in FIG. 17, two flat woven wires having different lengths are prepared as flat woven wires formed by interweaving three litz wires 10 as described above.

In this case, the flat woven wire having a length Y1 as shown in the figure will be referred to as a first flat woven wire 15, and the flat woven wire having a length Y2 longer than the length Y1 will be referred to as a second flat woven wire 16. Also in this case, preliminary soldering 11 is provided to both ends of the first flat woven wire 15 and the second flat woven wire 16 thus formed.

As shown in FIG. 17, also in the third embodiment, the first flat woven wire 15 having the shorter length is used as a wire material for a secondary winding N21 corresponding to the winding parts (the winding parts N2A1, N2B1, and N2C1) from the end parts at the winding starts to the center taps in the secondary winding of the isolated converter transformer shown in FIG. 6.

The second flat woven wire 16 having the longer length is used as a wire material for a secondary winding N22 corresponding to the winding parts (the winding parts N2A2, N2B2, and N2C2) from the center taps to the end parts at the winding ends.

Incidentally, in this case, Y1=25 cm and Y2=30 cm are set as the length Y1 of the first flat woven wire 15 and the length Y2 of the second flat woven wire 16, respectively.

Also in this case, the first flat woven wire 15 and the second flat woven wire 16 are set so as to be equal in total cross-sectional area (conductor part) of the secondary winding as a whole to that in the case of FIG. 6 in order to obtain equal operation to that of the circuit shown in FIG. 6.

Figure 18:
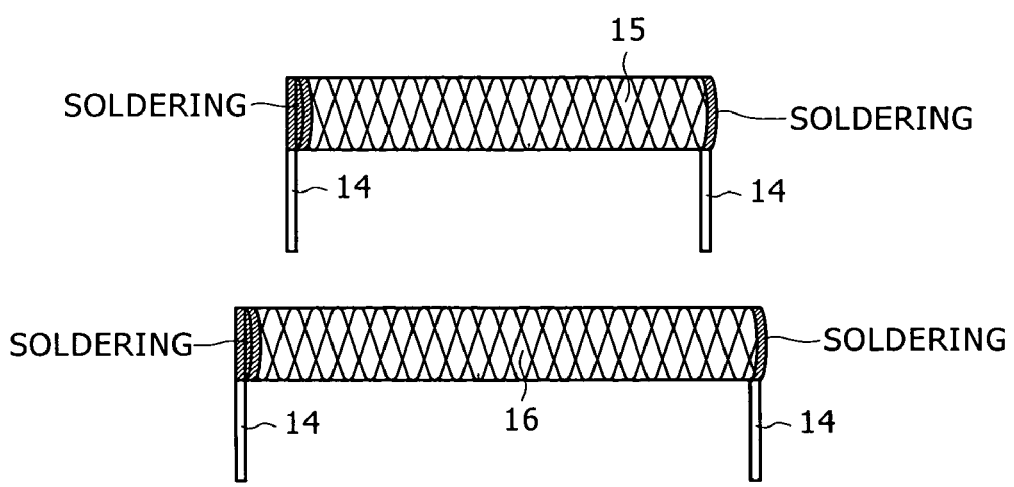
FIG. 18 is a diagram of assistance in explaining an example of structure of the secondary winding of the isolated converter transformer provided in the power supply circuit according to the third embodiment.

Further, also in the third embodiment, as shown in FIG. 18, lead wires 14 leading to the isolated converter transformer PIT are soldered to both the preliminarily soldered end parts of the first flat woven wire 15 and the second flat woven wire 16.

Then, the first flat woven wire 15 having the lead wire 14 soldered to each end part thereof is first wound around the secondary side winding part of the bobbin B in the isolated converter transformer PIT by a predetermined number of turns. Thereafter, the second flat woven wire 16 is wound on the outside of the thus wound first flat woven wire 15 by a predetermined number of turns.

Figure 19:
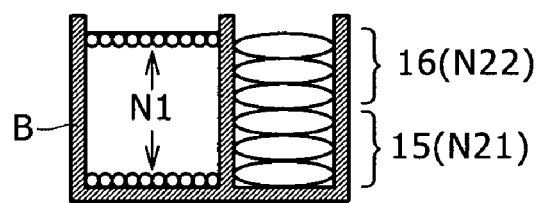
FIG. 19 is a diagram of assistance in explaining a wound state of the secondary winding of the isolated converter transformer provided in the power supply circuit according to the third embodiment.
Figure 19:
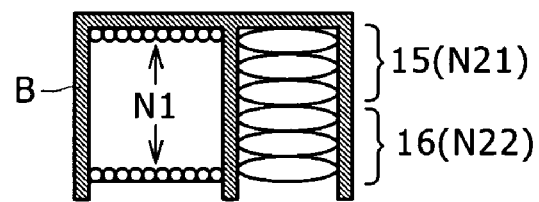

FIG. 19 is a sectional view showing a state of the windings being wound in the isolated converter transformer PIT in this case. As shown in the figure, the first flat woven wire 15 is wound by three turns around the winding part of the bobbin B. Then, following the thus wound first flat woven wire 15, the second flat woven wire 16 is similarly wound by three turns on the outside of the first flat woven wire 15.

Incidentally, though not described with reference to a figure, in this case, the lead wires 14 and 14 soldered to both end parts of the first flat woven wire 15 wound around the bobbin B as described above are each wound around a predetermined pin terminal of the isolated converter transformer PIT, and then soldered. Also, the lead wires 14 and 14 similarly soldered to both end parts of the second flat woven wire 16 are each wound around a predetermined pin terminal, and then soldered.

Thus, as the secondary winding of the isolated converter transformer PIT, the secondary winding N21 as the first flat woven wire 15 is wound on a winding start side and the secondary winding N22 as the second flat woven wire 16 is wound on a winding end side.

Also with the structure of the third embodiment, a state equal to that of the winding parts shown in FIG. 6 being wound in a state of being arranged in parallel with each other is obtained. Thus, it is possible to prevent a difference in the value of direct-current resistance between the winding parts. That is, also in this case, the value of combined direct-current resistance of each winding (the secondary winding N21 and the secondary winding N22) can be reduced as compared with the case of FIG. 6 (the secondary winding N2A and the secondary winding N2B).

According to an obtained result of an experiment, as the value of direct-current resistance of the secondary winding in the third embodiment, the value of combined direct-current resistance of the secondary winding N21 formed by the first flat woven wire 15 is Ro21=0.9 mΩ, and the value of combined direct-current resistance of the secondary winding N22 formed by the second flat woven wire 16 is Ro22=1.1 mΩ. That is, also in this case, the obtained result indicates that the values of combined direct-current resistance Ro21 and Ro22 are reduced as compared with the values of combined direct-current resistance Ro1=1.9 mΩ and Ro2=2.1 mΩ in the case of the circuit of FIG. 6.

When a rectified current of 30 A flows as in the circuit of FIG. 6, a power loss occurring in the secondary winding of the switching power supply circuit in this case is 0.9 W from $$30^2 \times (0.9+1.1) \times 10^{-3}/2$$

The third embodiment uses the first flat woven wire 15 and the second flat woven wire 16 formed by interweaving a plurality of litz wires 10 as described with reference to FIG. 17 as wire material for the secondary winding. Thus, by interweaving the plurality of litz wires 10, the third embodiment reduces an eddy-current loss in each litz wire 10.

That is, also in the third embodiment thus using flat woven wires as wire material for the secondary winding, it is possible to reduce an eddy-current loss caused by the flow of a high-frequency rectified current, and also suppress heat generation of the secondary winding due to the eddy-current loss.

According to an experimental result obtained, the AC-to-DC power conversion efficiency of the power supply circuit according to the third embodiment is ηAC→DC=91.0% under the condition of the alternating input voltage VAC=100 V and the load power Po=150 W. Thus, the AC-to-DC power conversion efficiency in this case is improved by about 3.0 percentage points as compared with ηAC→DC=about 88% in the case of the circuit of FIG. 6 under the same condition.

Also, an obtained result indicates that alternating-current input power in this case is reduced by 5.6 W as compared with the circuit of FIG. 6.

Further, also in this case, since the litz wires 10 are wound in a state equal to an aligned state as in the second embodiment, the secondary winding wound in the isolated converter transformer PIT can be wound by two windings. That is, also in this case, the switching power supply circuit can be configured as shown in FIG. 15. Also, the number of pin terminals of the isolated converter transformer PIT can be reduced to four as in the foregoing second embodiment.

Since the number of pin terminals can be decreased, an area for mounting the isolated converter transformer PIT on a board can be reduced, as described above. In addition, the manufacturing of the isolated converter transformer PIT becomes easier.

It is to be noted that while a configuration based mainly on the power supply circuit shown in FIG. 6 has been described above as the switching power supply circuit according to the third embodiment, similar effects can be obtained when the circuit of FIG. 10 is used as a basic configuration, by forming the secondary winding in a similar manner to that described with reference to FIGS. 17 to 19. A circuit on the secondary side in this case is configured as shown in FIG. 16.

A fourth embodiment of the present invention will next be described with reference to FIGS. 20 to 23.

Also in the fourth embodiment, only the structure of a secondary winding in an isolated converter transformer PIT is changed on the basis of the configuration of the power supply circuits shown in FIG. 6 and FIG. 10.

Also in this case, FIGS. 20 to 23 show the structure of the secondary winding of the isolated converter transformer PIT based on the configuration in which a center tap is provided to the secondary windings in FIG. 6.

Figure 20:
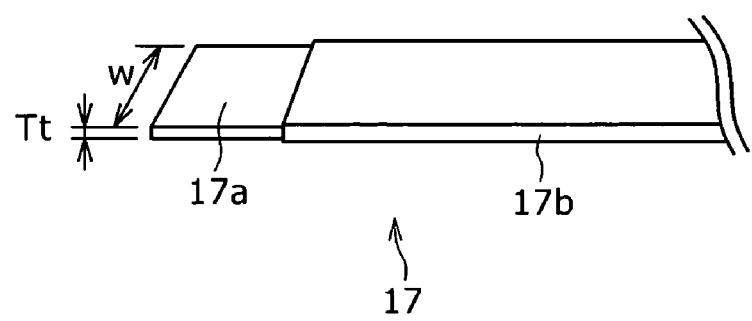
FIG. 20 is a diagram showing an example of structure of a film-shaped conductor used as a wire material for a secondary winding of an isolated converter transformer in the switching power supply circuit according to the fourth embodiment.

Unlike the foregoing second and third embodiments, the fourth embodiment uses a copper foil film 17 as shown in FIG. 20 as a wire material for the secondary winding of the isolated converter transformer PIT.

A plate-shaped copper wire formed by covering a copper foil plate 17a with an insulating film 17b as shown in FIG. 20 is used as the copper foil film 17.

Incidentally, the insulating film 17b may be a polyurethane film or a polyester tape, for example. In this case, a thickness Tt and a width W as shown in the figure of the copper foil plate 17a within the copper foil film 17 are Tt=0.075 mm and W=20 mm. Thus, in this case, a cross-sectional area s (conductor part) of the copper foil film 17 is s=1.50 mm².

Figure 21:
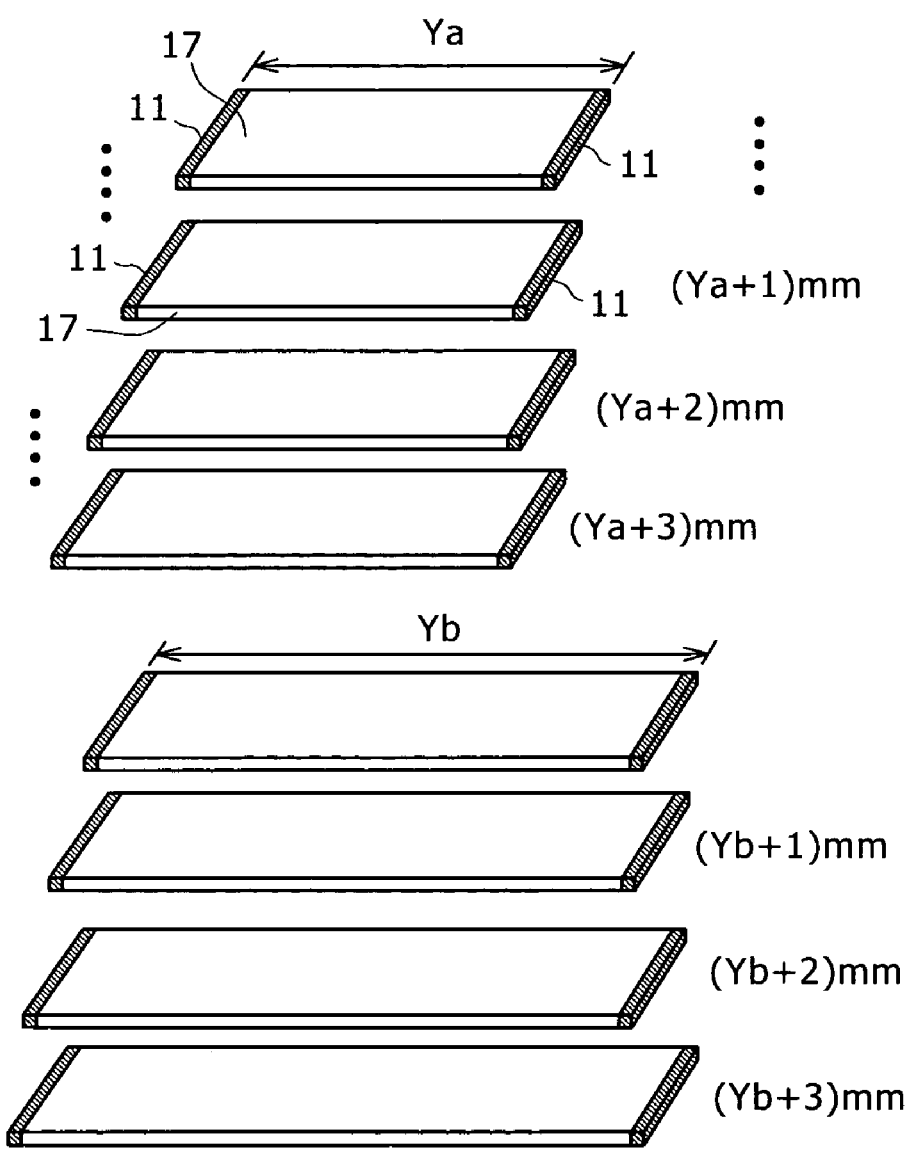
FIG. 21 is a diagram of assistance in explaining an example of structure of the secondary winding of the isolated converter transformer provided in the power supply circuit according to the fourth embodiment.

In the fourth embodiment, eight copper foil films having different lengths as shown in FIG. 21 are prepared as such copper foil films 17. In this case, one of the eight copper foil films has a length Ya as shown in the figure. A total of four copper foil films 17 of which the copper foil film 17 that is nearer to an outer side when wound around the bobbin B has a longer length, for example four copper foil films 17 having the length Ya, the length Ya+1 mm, the length Ya+2 mm, and the length Ya+3 mm, are prepared.

Further, in this case, as shown in the figure, four copper foil films 17 having a length Yb longer than the length Ya+3 mm, and lengths Yb+1 mm, Yb+2 mm, and Yb+3 mm, for example, are prepared.

Then, as shown in the figure, preliminary soldering 11 is provided to both end parts of each of the total of eight copper foil films 17.

Incidentally, the lengths Ya and Yb in this case are Ya=25 cm and Yb=30 cm.

Figure 22:
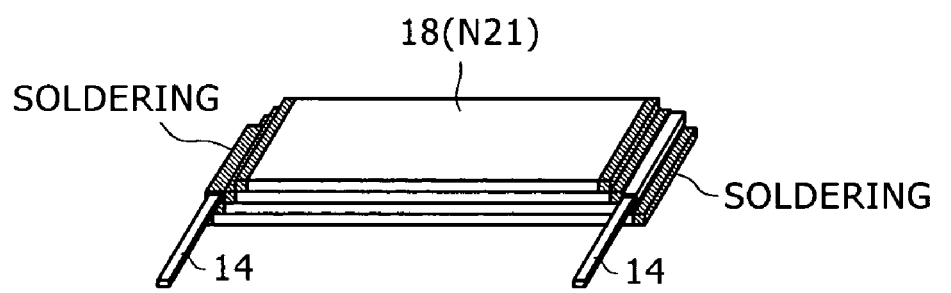
FIG. 22 is a diagram of assistance in explaining an example of structure of the secondary winding of the isolated converter transformer provided in the power supply circuit according to the fourth embodiment.
Figure 22:
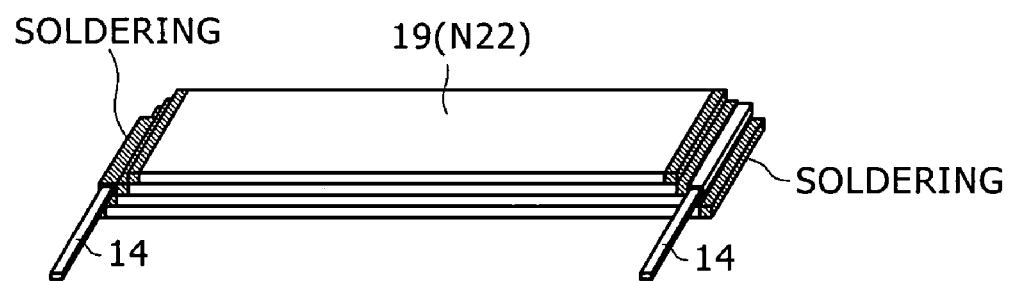

After such copper foil films 17 are prepared, the sets of four copper foil films 17 are laminated to form a first layer band 18 and a second layer band 19, respectively, as shown in FIG. 22.

In this case, the first layer band 18 is formed by laminating the four copper foil films 17 having the lengths Ya, Ya+1 mm, Ya+2 mm, and Ya+3 mm shown in FIG. 21 in that order. The second layer band 19 is formed by laminating the four copper foil films 17 having the lengths Yb, Yb+1 mm, Yb+2 mm, and Yb+3 mm in that order.

Also in this case, the first layer band 18 having the shorter length is used as a wire material for a secondary winding N21 corresponding to the winding parts (the winding parts N2A1, N2B1, and N2C1) from the end parts at the winding starts to the center taps in the secondary winding shown in FIG. 6.

The second layer band 19 having the longer length is used as a wire material for a secondary winding N22 corresponding to the winding parts (the winding parts N2A2, N2B2, and N2C2) from the center taps to the end parts at the winding ends.

Incidentally, also in this case, lead wires 14 leading to pin terminals of the isolated converter transformer PIT are soldered to both end parts of the first layer band 18 and the second layer band 19.

Also, a cross-sectional area of the first layer band 18 and the second layer band 19 (that is, a cross-sectional area of the copper foil plate 17*a*) is set such that a total cross-sectional area (conductor part) of the secondary winding as a whole is equal to that in the case of FIG. 6 in order to obtain equal operation to that of the circuit shown in FIG. 6.

Figure 23:
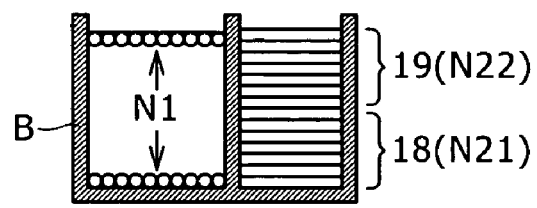
FIG. 23 is a diagram of assistance in explaining a wound state of the secondary winding of the isolated converter transformer provided in the power supply circuit according to the fourth embodiment.
Figure 23:
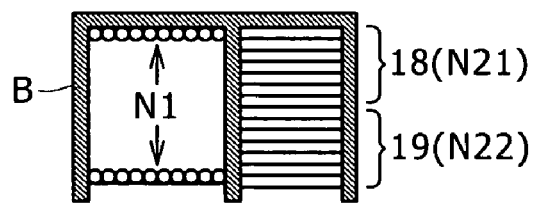

Then, in this case, as shown in a sectional view of FIG. 23, the first layer band 18 is first wound around the bobbin B of the isolated converter transformer PIT such that a plane of the first layer band 18 is stacked as shown in the figure. Further, the second layer band 19 is similarly wound on the outside of the thus wound first layer band 18 such that a plane of the second layer band 19 is stacked.

Also in this case, the first layer band 18 (the secondary winding N21) and the second layer band 19 (the secondary winding N22) are both wound by three turns.

Also with the structure of the fourth embodiment, a state equal to that of the winding parts shown in FIG. 6 being wound in a state of being arranged in parallel with each other is obtained. Thus, it is possible to prevent a difference in the value of direct-current resistance between the winding parts. That is, also in this case, the value of combined direct-current resistance of each winding (the secondary winding N21 and the secondary winding N22) can be reduced as compared with the case of FIG. 6 (the secondary winding N2A and the secondary winding N2B).

According to an obtained result of an experiment, as the value of direct-current resistance of the secondary winding in the fourth embodiment, the value of combined direct-current resistance of the secondary winding N21 formed by the first layer band 18 is Ro21=0.75 mΩ, and the value of combined direct-current resistance of the secondary winding N22 formed by the second layer band 19 is Ro22=0.9 mΩ. That is, also in this case, the obtained result indicates that the values of combined direct-current resistance Ro21 and Ro22 are reduced as compared with the values of combined direct-current resistance Ro1=1.9 mΩ and Ro2=2.1 mΩ in the case of the circuit of FIG. 6.

When a rectified current of 30 A flows as in the circuit of FIG. 6, a power loss occurring in the secondary winding of the switching power supply circuit in this case is 0.75 W from $$30^2 \times (0.75 + 0.9) \times 10^{-3}/2$$

In the fourth embodiment, the copper foil film 17 is used as wire material for the secondary winding, and the thickness Tt=0.075 mm, for example, is set for the copper foil plate 17*a* within the copper foil film 17. This numerical value is considerably smaller than the wire diameter X=0.10 mφ of the litz wire 10 in the case of FIG. 6.

Thus, the fourth embodiment can greatly reduce an eddy-current loss occurring in such a copper foil film 17 (copper foil plate 17*a*) as compared with the case of FIG. 6, and thereby suppress heat generation of the secondary winding due to the eddy-current loss.

According to an experimental result obtained, the AC-to-DC power conversion efficiency of the power supply circuit according to the fourth embodiment is ηAC→DC 91.5% under the condition of the alternating input voltage VAC=100 V and the load power Po=150 W. Thus, the AC-to-DC power conversion efficiency of the power supply circuit according to the fourth embodiment is improved by about 3.5 percentage points as compared with ηAC→DC=about 88% in the case of the circuit of FIG. 6 under the same condition.

Also, an obtained result indicates that alternating-current input power in this case is reduced by 6.5 W as compared with the circuit of FIG. 6.

Further, also in this case, the secondary winding wound in the isolated converter transformer PIT can be wound by two windings as in the foregoing second embodiment. That is, also in this case, the switching power supply circuit can be configured as shown in FIG. 15. Also, the number of pin terminals of the isolated converter transformer PIT can be reduced to four as in the foregoing second embodiment.

Since the number of pin terminals can be thus decreased, an area for mounting the isolated converter transformer PIT on a board can be reduced, and also the manufacturing of the isolated converter transformer PIT becomes easier.

It is to be noted that when the circuit of FIG. 10 is used as a basic configuration of the switching power supply circuit according to the fourth embodiment, similar effects can be obtained by forming the secondary winding in a similar manner to that described with reference to FIGS. 20 to 22. A circuit diagram in this case is shown as FIG. 16.

It is to be noted that the present invention is not limited to the configurations of the power supply circuits described so far.

For example, configuration of details of the synchronous rectifier circuit using the winding voltage detection system based on the present invention may be changed as required. Also, as the switching devices of the primary side switching converter, for example, devices other than MOS-FETs, such as IGBTs (Insulated Gate Bipolar Transistors), may be used as long as the devices are usable in an external excitation system. In addition, constants and the like of the parts and elements described above may be changed according to an actual condition or the like.

Further, a power supply circuit according to the present invention can be formed with a current resonant converter of a self-excited type. In this case, a bipolar transistor, for example, can be selected as a switching device. The present invention is also applicable to a current resonant converter with a full-bridge coupling of four switching devices.

INDUSTRIAL APPLICABILITY

Thus, according to the present invention, ineffective power corresponding to a period of discontinuity of a secondary side rectified current is not produced even with a synchronous rectifier circuit using a winding voltage detection system. It is therefore possible to improve power conversion efficiency to a level equal to that obtained when a synchronous rectifier circuit using a rectified current detection system is provided. Furthermore, since a circuit configuration itself of the synchronous rectifier circuit employs the winding voltage detection system, the configuration can be made simpler than that of the synchronous rectifier circuit using the rectified current detection system.

That is, the present invention both provides high power conversion efficiency in a complex resonant converter having a synchronous rectifier circuit and reduces a circuit scale and cost by simplifying the circuit. The present invention is advantageous especially when a power supply circuit is used under a condition of constant voltage and high current.

The invention claimed is:

1. A switching power supply circuit comprising:
    a switching unit formed with switching devices for performing switching so as to interrupt a direct-current input voltage input to the switching unit;
    a driving unit for switching-driving said switching devices;

an isolated converter transformer for transmitting a switching output of said switching unit from a primary side to a secondary side thereof, said isolated converter transformer having wound thereon at least a primary winding and a secondary winding;

a primary side resonant capacitor connected to a predetermined part on the primary side so as to form a primary side resonant circuit for converting an operation of said switching unit into a resonance type operation with at least a leakage inductance component of the primary winding of said isolated converter transformer and a capacitance of the primary side resonant capacitor;

a primary side partial voltage resonant circuit for performing a partial voltage resonant operation during a period that the switching devices forming said switching unit are turned off, said primary side partial voltage resonant circuit being formed by a capacitance of a partial resonant capacitor connected in parallel with at least one of the switching devices forming said switching unit and the leakage inductance component of the primary winding of said isolated converter transformer; and a synchronous rectifier circuit for providing a secondary side direct-current output voltage as a voltage across a secondary side smoothing capacitor by performing a rectifying operation on an alternating voltage induced in the secondary winding of said isolated converter transformer and charging said secondary side smoothing capacitor with a rectified current;

wherein said synchronous rectifier circuit includes:

a first field-effect transistor inserted between one end of said secondary winding and a negative electrode terminal of said secondary side smoothing capacitor;

a second field-effect transistor inserted between another end of said secondary winding and the negative electrode terminal of said secondary side smoothing capacitor;

a first driving circuit for detecting, by a resistive element, a secondary winding voltage corresponding to a half-wave period in which said first field-effect transistor makes a rectified current flow, and outputting a gate voltage for turning on said first field-effect transistor; and a second driving circuit for detecting, by a resistive element, a secondary winding voltage corresponding to a half-wave period in which said second field-effect transistor makes a rectified current flow, and outputting a gate voltage for turning on said second field-effect transistor, wherein a magnetic flux density of said isolated converter transformer is set to a predetermined value so that the secondary side rectified current flowing through the synchronous rectifier circuit as a result of said rectifying operation is in a continuous mode irrespective of a variation in a condition of a load connected to said secondary side direct-current voltage.

2. The switching power supply circuit as claimed in claim 1, wherein, in order to set the magnetic flux density of said isolated converter transformer to a certain value, a coupling coefficient between the primary side and the secondary side is set to a predetermined value by making a gap length formed in the isolated converter transformer a predetermined value.

3. The switching power supply circuit as claimed in claim 1, wherein, in order to set the magnetic flux density of said isolated converter transformer to a certain value, numbers of turns of said primary winding and said secondary winding are set such that a voltage level induced per turn of said secondary winding is a predetermined value.

4. The switching power supply circuit as claimed in claim 1, further comprising a constant-voltage control unit for performing constant-voltage control on said secondary side direct-current output voltage by variably controlling a switching frequency of said switching unit according to a level of said secondary side direct-current output voltage.

5. The switching power supply circuit as claimed in claim 1, wherein the secondary winding of the isolated converter transformer comprises a litz wire band formed by aligning a plurality of litz wires having elemental wires of a wire diameter less than a predetermined value and forming the plurality of litz wires into a band shape.

6. The switching power supply circuit as claimed in claim 1, wherein the secondary winding of the isolated converter transformer comprises a flat woven wire formed by weaving a plurality of litz wires having elemental wires of a wire diameter less than a predetermined value into a flat shape.

7. The switching power supply circuit as claimed in claim 1, wherein the secondary winding of the isolated converter transformer comprises a laminated film band formed by laminating a plurality of film-shaped conductors having a cross-sectional area less than a predetermined value, the film-shaped conductors being covered with an insulating film.

8. The switching power supply circuit as claimed in claim 4, claim 5, or claim 6, wherein, both end parts of said litz wire band, said flat woven wire, or said laminated film band are preliminarily soldered, and then each soldered to a lead wire.

* * * * *

UNITED STATES PATENT AND TRADEMARK OFFICE
CERTIFICATE OF CORRECTION

| | |
|---|---|
| PATENT NO. | : 7,095,629 B2 |
| APPLICATION NO. | : 10/528543 |
| DATED | : August 22, 2006 |
| INVENTOR(S) | : Masayuki Yasumura |

It is certified that error appears in the above-identified patent and that said Letters Patent is hereby corrected as shown below:

Column 21, line 59, "ila" should read --10a--. **

Signed and Sealed this

Third Day of April, 2007

JON W. DUDAS
*Director of the United States Patent and Trademark Office*